US007754064B2

(12) United States Patent
Buschmann et al.

(10) Patent No.: US 7,754,064 B2
(45) Date of Patent: Jul. 13, 2010

(54) METHODS AND APPARATUS FOR THE ON-SITE PRODUCTION OF HYDROGEN PEROXIDE

(75) Inventors: Wayne E. Buschmann, Boulder, CO (US); Patrick I. James, Boulder, CO (US)

(73) Assignee: Eltron Research & Development, Boulder, CO (US)

( * ) Notice: Subject to any disclaimer, the term of this patent is extended or adjusted under 35 U.S.C. 154(b) by 0 days.

(21) Appl. No.: 11/536,973

(22) Filed: Sep. 29, 2006

(65) Prior Publication Data

US 2007/0074975 A1 Apr. 5, 2007

(51) Int. Cl.
C25B 1/30 (2006.01)
(52) U.S. Cl. ........................ 205/466; 205/468; 204/257; 204/258; 204/265
(58) Field of Classification Search ................. 205/466, 205/468; 204/257, 258, 265
See application file for complete search history.

(56) References Cited

U.S. PATENT DOCUMENTS

| 3,415,377 A | 12/1968 | Higgins |
| 3,446,671 A | 5/1969 | Kring |
| 3,454,477 A | 7/1969 | Grangaard |
| 3,462,351 A | 8/1969 | Grangaard |
| 3,507,769 A | 4/1970 | Grangaard |
| 3,969,201 A | 7/1976 | Oloman et al. |
| 4,118,305 A | 10/1978 | Oloman et al. |
| 4,350,575 A | 9/1982 | Porta et al. |
| 4,357,217 A | 11/1982 | Kuehn et al. |
| 4,384,931 A | 5/1983 | Jasinski et al. |
| 4,431,494 A | 2/1984 | McIntyre et al. |
| 4,445,986 A | 5/1984 | McIntyre et al. |
| 4,455,203 A | 6/1984 | Stucki |
| 4,457,953 A | 7/1984 | McIntyre et al. |
| 4,511,441 A | 4/1985 | McIntyre et al. |

(Continued)

FOREIGN PATENT DOCUMENTS

EP 0 949 205 B1 4/2003

(Continued)

OTHER PUBLICATIONS

Saha, Madhu Sudan; Nishiki, Yoshinori; Furuta, Tsuneto, and Ohsaka, Takeo; "Electrolytic Synthesis of Peroxyacetic Acid Using In Situ Generated Hydrogen Peroxide on Gas Diffusion Electrodes"; Journal of the Electrochemical Society; 2004; D93-D97; 151 (9); The Electrochemical Society, Inc.; USA.

(Continued)

*Primary Examiner*—Arun S Phasge
(74) *Attorney, Agent, or Firm*—Conley Rose, P.C.

(57) ABSTRACT

Methods, apparatus, and applications for the on-site production of hydrogen peroxide are described. An embodiment of the apparatus comprises at least one anolyte chamber coupled to at least one anode, at least one catholyte chamber, wherein the at least one catholyte chamber is coupled to at least one cathode, at least one anode membrane and at least one cathode membrane, wherein the anode membrane is adjacent to the at least one anode, wherein the cathode membrane is adjacent to the at least one cathode, at least one central chamber disposed between the at least one anolyte chamber and the at least one catholyte chamber. Hydrogen peroxide is produced by reduction of an oxygen-containing gas at the cathode.

21 Claims, 16 Drawing Sheets

U.S. PATENT DOCUMENTS

| | | |
|---|---|---|
| 4,572,774 A | 2/1986 | Wrighton et al. |
| 4,758,317 A | 7/1988 | Chiang |
| 4,891,107 A | 1/1990 | Dong et al. |
| 4,921,587 A | 5/1990 | Dong et al. |
| 4,927,509 A | 5/1990 | Mathur et al. |
| 5,244,547 A | 9/1993 | Clifford et al. |
| 5,316,629 A | 5/1994 | Clifford et al. |
| 5,358,609 A | 10/1994 | Drackett |
| 5,464,513 A | 11/1995 | Goriachev et al. |
| 5,512,263 A | 4/1996 | McIntyre |
| 5,565,073 A | 10/1996 | Fraser et al. |
| 5,643,437 A | 7/1997 | Dong et al. |
| 5,645,700 A | 7/1997 | White et al. |
| 5,647,968 A | 7/1997 | Fraser et al. |
| 5,702,585 A * | 12/1997 | Hillrichs et al. ............. 205/466 |
| 5,720,869 A | 2/1998 | Yamanaka et al. |
| 5,800,796 A | 9/1998 | Webb et al. |
| 6,004,449 A | 12/1999 | Vetrovec |
| 6,042,804 A | 3/2000 | Huckins |
| 6,159,349 A | 12/2000 | Wakita et al. |
| 6,224,744 B1 * | 5/2001 | Casado Gimenez et al. . 205/756 |
| 6,254,762 B1 * | 7/2001 | Uno et al. ................... 205/466 |
| 6,368,488 B1 | 4/2002 | Scherson |
| 6,547,947 B1 * | 4/2003 | Uno et al. ................... 205/466 |
| 6,565,736 B2 | 5/2003 | Park et al. |
| 6,685,818 B2 | 2/2004 | Lehmann et al. |
| 6,712,949 B2 | 3/2004 | Gopal |
| 6,761,815 B2 | 7/2004 | Nakajima et al. |
| 6,767,447 B2 | 7/2004 | Uno et al. |
| 6,773,575 B2 | 8/2004 | Nakajima et al. |
| 7,012,154 B2 | 3/2006 | Vineyard et al. |
| 7,025,868 B2 | 4/2006 | Bunn et al. |
| 2002/0036147 A1 | 3/2002 | Lehmann et al. |
| 2002/0134687 A1 | 9/2002 | Nakajima et al. |
| 2002/0153262 A1 | 10/2002 | Uno et al. |
| 2003/0019758 A1 | 1/2003 | Gopal |
| 2003/0070940 A1 | 4/2003 | Hirayama et al. |
| 2003/0089618 A1 | 5/2003 | Satoh et al. |
| 2005/0139808 A1 | 6/2005 | Alimi |
| 2007/0023294 A1 | 2/2007 | Trimmer et al. |
| 2007/0053829 A1 | 3/2007 | Sethi et al. |
| 2007/0131540 A1 | 6/2007 | Nemeth et al. |

FOREIGN PATENT DOCUMENTS

| | | |
|---|---|---|
| JP | 6-265808 | 9/1994 |
| WO | WO 9114802 | 10/1991 |
| WO | 2005021443 A1 | 3/2005 |
| WO | WO 2005038091 A2 | 4/2005 |
| WO | WO 2007028375 A1 | 3/2007 |
| WO | WO 2007032577 A1 | 3/2007 |

OTHER PUBLICATIONS

Yang, Hsueh-Hui and McCreery, Richard L.; "Elucidation of the Mechanism of Dioxygen Reduction on Metal-Free Carbon Electrodes"; Journal of the Electrochemical Society; 2000; pp. 3420-3428; vol. 147, (9); USA.

Kinoshita, Kim; "Electrochemical Oxygen Technology"; The Electrochemical Society Series; A Wiley-Interscience Publication; 1992; pp. 366-373; USA.

Sudoh, Masao; Minamoto, Kimihisa; Makino, Tomohiko; and Hakamada, Hitoshi; "Production of Hydrogen Peroxide in Acidic Solutions By Electrodialysis of Peroxide Ions Generated By Electroreduction of Oxygen in Alkaline Solutions"; Journal of Chemical Engineering of Japan; 1991; pp. 465-471; vol. 24, No. 4; Japan.

Fredlein, Ronald A. and Bard, Allen J.; "Semiconductor Electrodes—The Characterization and Behavior of n-Type Fe2O3 Electrodes in Acetonitrile Solutions"; Journal of Electrochemical Society; Nov. 1979; pp. 1892; USA.

Kuehn, Christa and Leder, Frederic and Jasinski, Raymond and Gaunt, Kathy; "The Electrolytic Synthesis of Hydrogen Peroxide in a Dual Membrane Cell" Journal of Electrochemical Society; Electrochemical Science and Technology; May 1983; vol. 130, No. 5; pp. 1117-1119; USA.

Oloman, Colin; "Trickle Bed Electrochemical Reactors"; Journal of Electrochemical Society; Electrochemical Science and Technology; Nov. 1979; vol. 126, No. 11; pp. 1885-1891; USA.

Sudoh, Masao and Kodera, Takamasa, and Ichino, Teruo; "Effect of Oxygen Sparging into Packed-Bed Electrode on Production Rate of Hydrogen Peroxide"; Journal of Chemical Engineering of Japan; 1991; vol. 24, No. 2; pp. 165-170; Japan.

International Search Report dated Jan. 30, 2008 for PCT/US2007/79498.

* cited by examiner

METHODS AND APPARATUS FOR THE ON-SITE PRODUCTION OF HYDROGEN PEROXIDE

STATEMENT REGARDING FEDERALLY SPONSORED RESEARCH OR DEVELOPMENT

This invention was made with U.S. government support under USDA Contract No. 2002,33610-11793, NASA Contract No. NAS 9-99141, EPA Contract No. 68-D-02-052, and USDA Contract No. 2003-33610-14035. The U.S. Government has certain rights in this invention.

CROSS-REFERENCE TO RELATED APPLICATIONS

Not applicable

BACKGROUND

1. Field of the Invention

This disclosure relates generally to the field of hydrogen peroxide production. More specifically, this disclosure relates to methods and apparatus for the on-site and in-situ production of hydrogen peroxide.

2. Background of the Invention

Hydrogen peroxide ($H_2O_2$) has long been known as an antiseptic but has not been widely used for industrial sterilization largely due to cost. It also typically requires significantly higher dosage levels than chlorine for similar activity. In light of the tightening regulation of chlorinated compounds, however, this compound is being re-examined and is found to be quite effective in a number of industrial disinfection applications. Also, when indirect costs for factors such as corrosion, liability and insurance, and safety concerns are taken into account, the cost for treating with $H_2O_2$ is found to be very similar to that for the use of chlorine in the control of biofouling in powerplants, and in several Orange County, Calif. sewage treatment facilities. When employed to accomplish sterilization in these situations, $H_2O_2$ concentrations of 50-200 ppm are typically required for sufficient effectiveness although recent data suggests that as little as 2 ppm can be effective towards fouling control.

The main drawbacks to traditional (chemical) sources of hydrogen peroxide are cost and safety. Industrial bulk sources of concentrated hydrogen peroxide are currently produced by use of a catalyzed reaction cycle which entails reducing anthraquinone to anthrahydroquinone using hydrogen, followed by air oxidation back to anthraquinone. In this process, the oxygen is reduced to hydrogen peroxide. This approach does not permit pure hydrogen peroxide to be generated directly in liquid streams because the direct required contact between oxygen and anthrahydroquinone contaminates the hydrogen peroxide with the quinone and the products of its oxidation and degradation. Consequently, present industrially established methods for hydrogen peroxide production produce bulk quantities of the chemical which are subsequently shipped to, and stored by, the hydrogen peroxide user. This leads to substantial expenses for transportation and storage. On-site production of hydrogen peroxide in the liquid stream of concern would eliminate the time and expense of storage and transportation, as well as the associated hazards.

Concentrated chlorine is much less expensive to use, but has several disadvantages. First, strong chemicals must be manually handled and stored in concentrated form on site, posing an occupational hazard to workers. Generating cleansing solutions when needed at the proper concentrations on site would substantially reduce these hazards. Second, few membranes (especially NF and RO membranes) can tolerate significant levels of chlorine without degrading, whereas hydrogen peroxide has better membrane compatibility. Third, discharges of residual chlorine into the environment are now known to be harmful due to its high reactivity, which results in the formation of toxic and potentially carcinogenic chlorinated disinfection byproducts (e g, trihalomethanes, haloacetic acids). Conversely, residual hydrogen peroxide readily autodecomposes to environmentally benign water and oxygen.

Consequently, there is substantial need in the art for the efficient production of hydrogen peroxide, on site, at low concentrations, and at low cost.

BRIEF SUMMARY

These and other needs in the art are addressed in an embodiment by apparatus for producing hydrogen peroxide comprising at least one anolyte chamber. The at least one anolyte chamber is coupled to at least one anode. The apparatus also comprises at least one catholyte chamber, wherein the at least one catholyte chamber is coupled to at least one cathode. Furthermore, the apparatus comprises at least one anode membrane and at least one cathode membrane, wherein the at least one anode membrane is adjacent to the at least one anode, wherein the at least one cathode membrane is adjacent to the at least one cathode. The apparatus additionally comprises at least one central chamber, wherein the at least one central chamber is disposed between the at least one anolyte chamber and the at least one catholyte chamber.

In an embodiment, a method for producing hydrogen peroxide comprises supplying at least one anolyte feed stream comprising water and at least one catholyte feed stream comprising an oxygen-containing gas to an electrolytic cell comprising at least one catholyte chamber, at least one anolyte chamber, and at least one central chamber, wherein the at least one central chamber is disposed between the at least one catholyte chamber and the at least one anolyte chamber. The method further comprises conveying the at least one catholyte feed stream into the at least one catholyte chamber, wherein each catholyte feed stream contacts a cathode which is adjacent to at least one cathode membrane. Moreover, the method comprises conveying the anolyte feed stream into an anolyte chamber coupled to at least one anode, wherein the anolyte feed stream contacts the least one anode which is adjacent to at least one anode membrane. In addition, the method comprises applying an electrical current to the at least one anode and the at least one cathode, wherein the anolyte feed stream is oxidized to produce $H^+$ protons and oxygen, wherein the $H^+$ protons move from the anolyte chamber through the at least one central chamber to the catholyte chamber, wherein the catholyte feed stream is reduced to form peroxide ions which react with the $H^+$ protons to form a catholyte exit stream comprising hydrogen peroxide.

In an embodiment, a method of treating ballast water comprises supplying at least one anolyte feed stream comprising water and at least one catholyte feed stream comprising ballast water and an oxygen-containing gas to an electrolytic cell comprising at least one catholyte chamber, at least one anolyte chamber, at least one central chamber, wherein the at least one central chamber is disposed between the at least one catholyte chamber and the at least one anolyte chamber. In addition, the method comprises conveying the catholyte feed stream into the at least one catholyte chamber, wherein the catholyte feed stream contacts at least one cathode which is adjacent to at least one cathode membrane. The method also comprises conveying the anolyte feed stream into an anolyte chamber coupled to at least one anode, wherein the anolyte feed stream contacts the least one anode which is adjacent to at least one anode membrane. Moreover, the method comprises applying an electrical current to the at least one anode and the at least one cathode, wherein the anolyte feed stream is oxidized to produce $H^+$ protons and oxygen, wherein the $H^+$ protons move from the anolyte chamber, through the at least one central chamber to the catholyte chamber, wherein the catholyte feed stream is reduced to form peroxide ions which react with the $H^+$ protons to produce hydrogen peroxide, wherein the hydrogen peroxide sterilizes the ballast water exiting the catholyte chamber.

In an embodiment, a method of cleaning dairy filtration membranes comprises supplying at least one anolyte feed stream comprising water and at least one catholyte feed stream comprising an oxygen-containing gas to an electrolytic cell comprising at least one catholyte chamber, at least one anolyte chamber, at least one central chamber, wherein the at least one central chamber is disposed between the at least one catholyte chamber and the at least one anolyte chamber. Furthermore, the method comprises conveying the catholyte feed stream into the at least one catholyte chamber, wherein the catholyte feed stream contacts at least one cathode which is adjacent to at least one cathode membrane. The method additionally comprises conveying the anolyte feed stream into an anolyte chamber coupled to at least one anode, wherein the anolyte feed stream contacts the least one anode which is adjacent to at least one anode membrane. The method also comprises applying an electrical current to the at least one anode and the at least one cathode, wherein the anolyte feed stream is oxidized to produce $H^+$ protons and oxygen, wherein the $H^+$ protons move from the anolyte chamber, through the at least one central chamber to the catholyte chamber, wherein the catholyte feed stream is reduced to form peroxide ions which react with the $H^+$ protons to form a hydrogen peroxide cleaning solution exiting the catholyte chamber and passing the hydrogen peroxide cleaning solution through a dairy filtration membrane.

In an embodiment, a method of treating dirty water to produce a clean water stream comprises supplying at least one anolyte feed stream comprising water and at least one catholyte feed stream comprising dirty water and an oxygen-containing gas to an electrolytic cell comprising at least one catholyte chamber, at least one anolyte chamber, at least one central chamber, wherein the at least one central chamber is disposed between the at least one catholyte chamber and the at least one anolyte chamber. In addition, the method comprises conveying the catholyte feed stream into the at least one catholyte chamber, wherein the catholyte feed stream contacts at least one cathode which is adjacent to at least one cathode membrane. The method also comprises conveying the anolyte feed stream into an anolyte chamber coupled to at least one anode, wherein the anolyte feed stream contacts the least one anode which is adjacent to at least one anode membrane. Moreover, the method comprises applying an electrical current to the at least one anode and the at least one cathode, wherein the anolyte feed stream is oxidized to produce $H^+$ protons and oxygen, wherein the $H^+$ protons move from the anolyte chamber, through the at least one central chamber to the catholyte chamber, wherein the catholyte feed stream is reduced to form peroxide ions which react with the $H^+$ protons to produce hydrogen peroxide, wherein the hydrogen peroxide cleans and/or sterilizes the dirty water to produce a clean water stream exiting the catholyte chamber. In a related embodiment, the dirty water preferably comprises cooling tower water. In a related embodiment, the dirty water preferably comprises waste water. In a related embodiment, the clean water stream produced from the dirty water preferably comprises a potable water stream.

An objective of the invention is to generate disinfectant solutions containing concentrations of hydrogen peroxide sufficient to be effective against a wide variety of organisms. In an embodiment, as much as 1000 ppm hydrogen peroxide may be generated, and be effective against a wide variety of microorganisms. Producing these levels of peroxide with the disclosed methods and apparatus is efficient. For example, hydrogen peroxide produced by an embodiment of the electrolytic technology described herein may cost only about $\frac{1}{10}$th that of hydrogen peroxide produced by the common bulk production process based on anthraquinone auto oxidation. While the pH shifts developed by this technology are significant and will aid the disinfection, the concentrations will still be 3-4 orders of magnitude safer than concentrated sources of cleansers used in traditional dilution dosing schemes. Thus the proposed methods and apparatus are not only convenient, low-cost, and environmentally gentle, they are also significantly safer than alternative existing technologies.

Potential applications of the described methods and apparatus include cleansing, microbial control, value-added chemical processes, and advanced oxidation processes for chemical degradation. The areas of sterilization and environmental reclamation provide the most obvious potential markets, particularly as a replacement for the use of chlorinated compounds in the former. The technology has been shown to be effective in treatment of liquid streams. The treatment of cooling tower water to control microbial buildup as well as treatment of ship ballast water for reduction of non-native organisms are two applications that have received much attention. The treatment of infectious waste liquid streams generated at medical facilities has become a significant market with tightening constraints on waste disposal emissions. Competitive advantages of this electrolytic technology include adaptability to both small and large scale treatment volumes, on site and on demand treatment, and low cost hydrogen peroxide production. Additionally, the point of use generation of an environmentally gentle oxidant obviates the need for transport and storage of concentrated hydrogen peroxide thus reducing health, safety, and environmental risks.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. This document does not intend to distinguish between components that differ in name but not function.

In the following discussion and in the claims, the terms "including" and "comprising" are used in an open-ended fashion, and thus should be interpreted to mean "including, but not limited to . . .". Also, the term "couple" or "couples" is intended to mean either an indirect or direct electrical connection. Thus, if a first device couples to a second device, that connection may be through a direct electrical connection, or through an indirect electrical connection via other devices and connections.

Detailed Description of the Preferred Embodiments

The general aspects of electrolytic generation of hydrogen peroxide by the proposed embodiments of the method and apparatus will now be briefly discussed. The electrolytic generation of hydrogen peroxide can occur through several reaction routes. In preferred embodiments, the following reactions are dominant:

At the cathode: $2H^+ + O_2 + 2e^- \rightarrow H_2O_2$ (1) 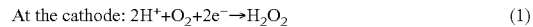

At the anode: $H_2O \rightarrow 2H^+ + \frac{1}{2}O_2 + 2e^-$ (2) 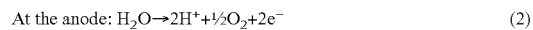

giving the overall reaction: $H_2O + \frac{1}{2}O_2 \rightarrow H_2O_2$ (3) 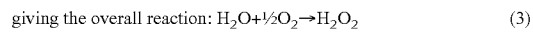

Cathode electrocatalysts for the direct production of hydrogen peroxide strive to promote the two electron oxygen reduction pathway shown in equation (1) in preference to the more common four electron path leading to water production as shown in equation (4):

$4H^+ + O_2 + 4e^- \rightarrow 2H_2O$ (4) 

Equation (2) shows that acid ($H^+$) and dioxygen production by water oxidation are the dominant anode reaction. Acid produced at the anode is utilized for both acid cleansing and pH adjustment or neutralization of alkaline solutions. Equation (3) combines the reactions and illuminates the fact that the only required consumables for this approach will be oxygen, electricity, and, of course, water. The pH of the catholyte is raised by the production of hydroxyl ions by parasitic reduction of hydrogen peroxide and other possible side reactions.

Figure 1:
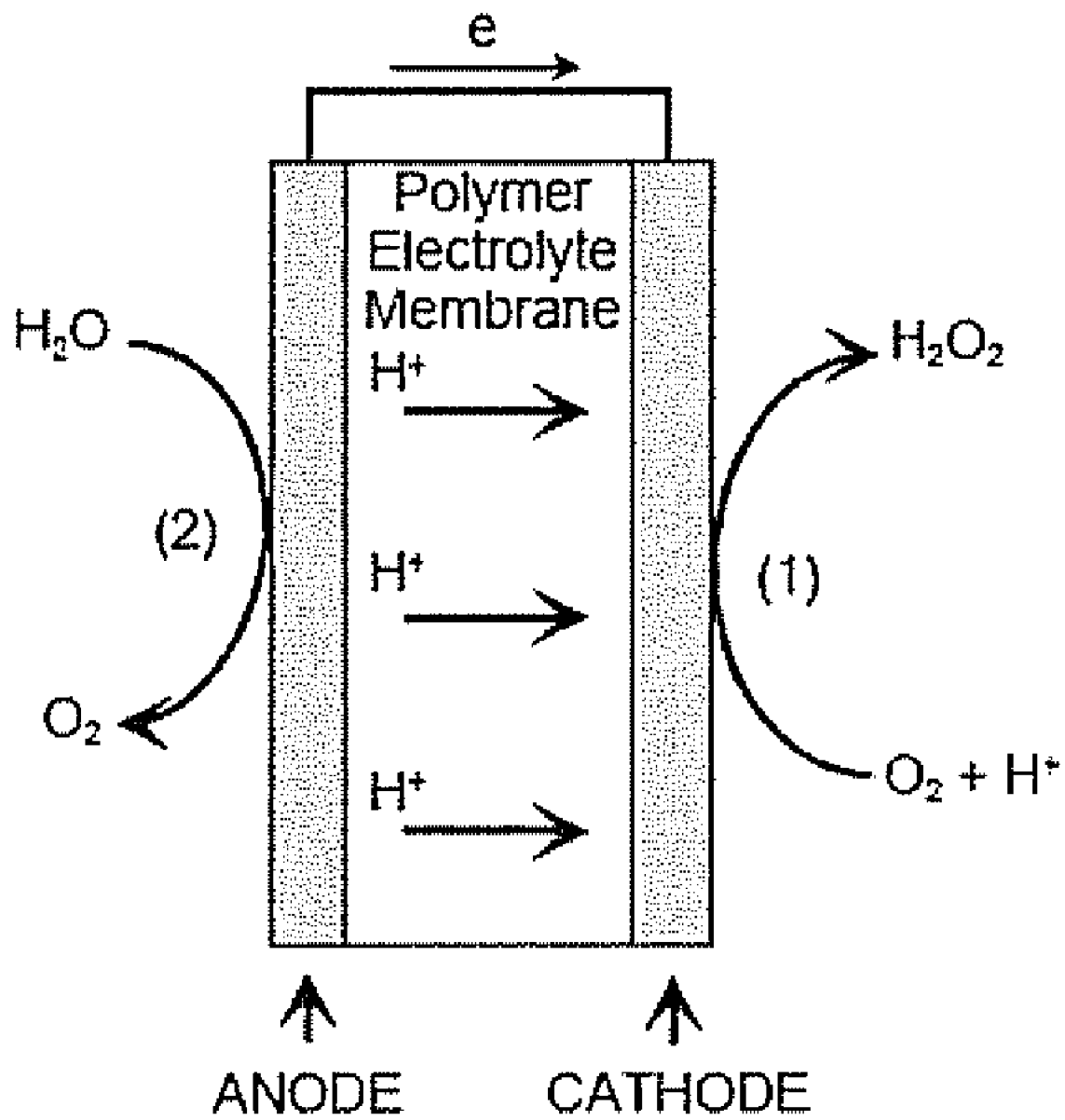
FIG. 1 depicts a schematic of electrochemical production of hydrogen peroxide.

Referring now to FIG. 1, there is provided a diagram showing the general aspects of an electrolytic cell. This diagram illustrates how the target chemistry occurs using "zero gap" (between electrodes) technology. Reactions in equations (1) and (2) are separated by a proton-conducting polymer electrolyte membrane that facilitates hydrogen peroxide production.

Figure 2:
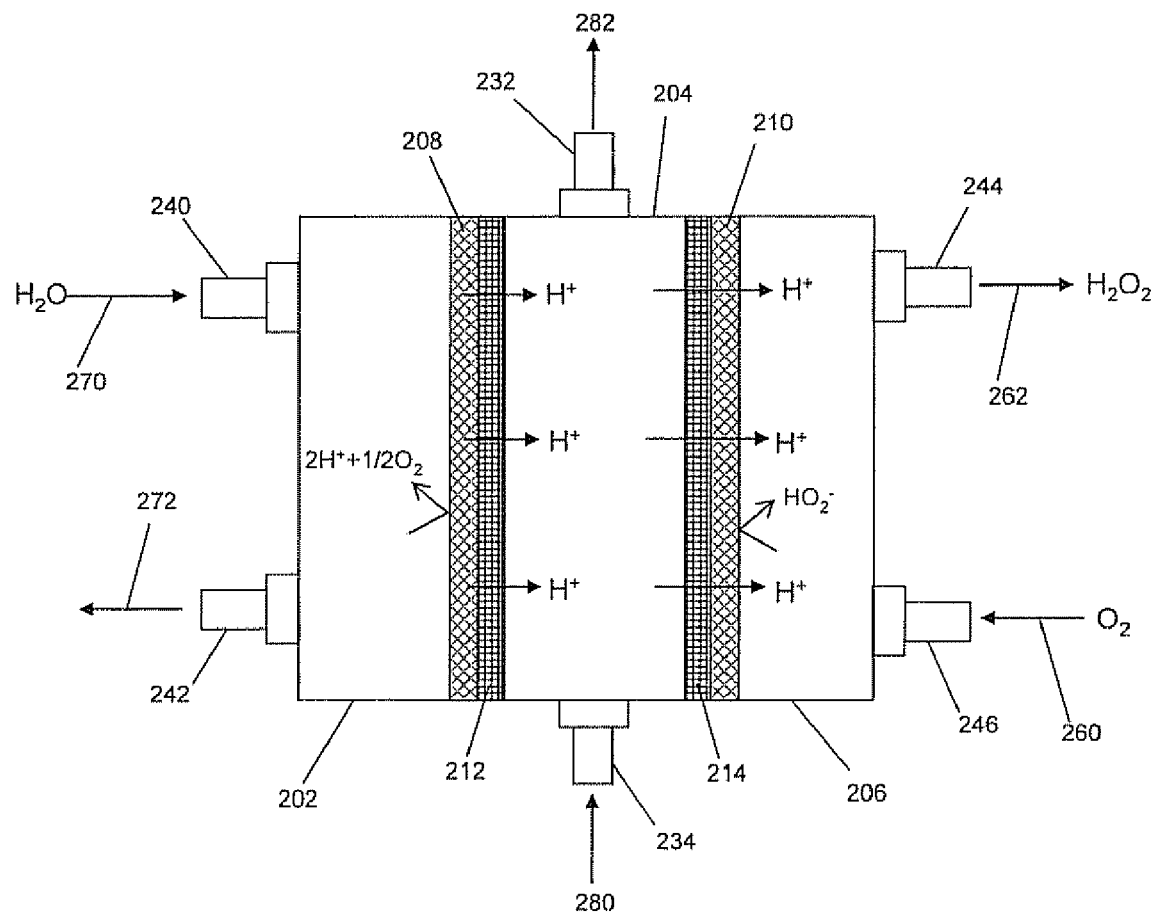
FIG. 2 illustrates an embodiment of an apparatus for the production of hydrogen peroxide.

Referring now to FIG. 2, there is illustrated an embodiment of an apparatus for on-site production of hydrogen peroxide utilizing the above described reactions. In an embodiment, the apparatus generally includes without limitation, an anolyte chamber 202, an anode 208, a first membrane 212, a central chamber 204, a second membrane 214, a cathode 210, and a catholyte chamber 206. Although the anolyte chamber 202, central chamber 204 and catholyte chamber 206 in FIG. 2 are shown with rectangular geometry, any suitable geometries may be used. Furthermore, the anolyte chamber 202, central chamber 204, and catholyte chamber 206 generally comprise materials that are compatible with electrolytic chemistry. Examples of suitable materials include without limitation, polypropylene, polyvinyl chloride, polyacrylates, HDPE, PTFE, polycarbonate, or combinations thereof. Generally, the anolyte chamber 202 comprises an anolyte chamber inlet and an anolyte chamber outlet.

Preferably, the anolyte chamber 202 is coupled to at least one anode 208. In typical embodiments, the anode 208 is in fluid communication with the anolyte inside the anolyte chamber 202. The anode 208 may comprise any suitable material. Preferably, anode 208 comprises a conductive and catalytically active material. Examples of suitable materials include without limitation, titanium, platinum, gold, silver, copper, steel, graphite, silicon, anodized titanium, reticulated vitreous carbon, or combinations thereof. Alternatively, the anode 208 comprises a substrate coated with an electrically conductive material. Additionally, the anode 208 may comprise a substrate coated with a metal oxide or a doped metal oxide. For example, the anode 208 may comprise titanium coated with a tantalum-doped iridium oxide coating. Other coatings include without limitation, lead oxide, tin oxide, titanium oxides, mixed metal oxides, or combinations thereof.

Furthermore, the anode 208 may have a configuration which maximizes contact with the anolyte within the anolyte chamber 202. Typically, the anode 208 is substantially planar. However, the anode 208 may comprise any suitable geometry which provides maximum surface area to the anolyte in the anolyte chamber 202. Preferably, the anode 208 comprises a dimensionally stable anode (DSA) that is optimized for oxygen production. In an embodiment, the anode 208 comprises a mesh. In general, the anode 208 is permeable to liquids. The anode 208 may further be coupled to the anolyte chamber 202 by any means.

Figure 3:
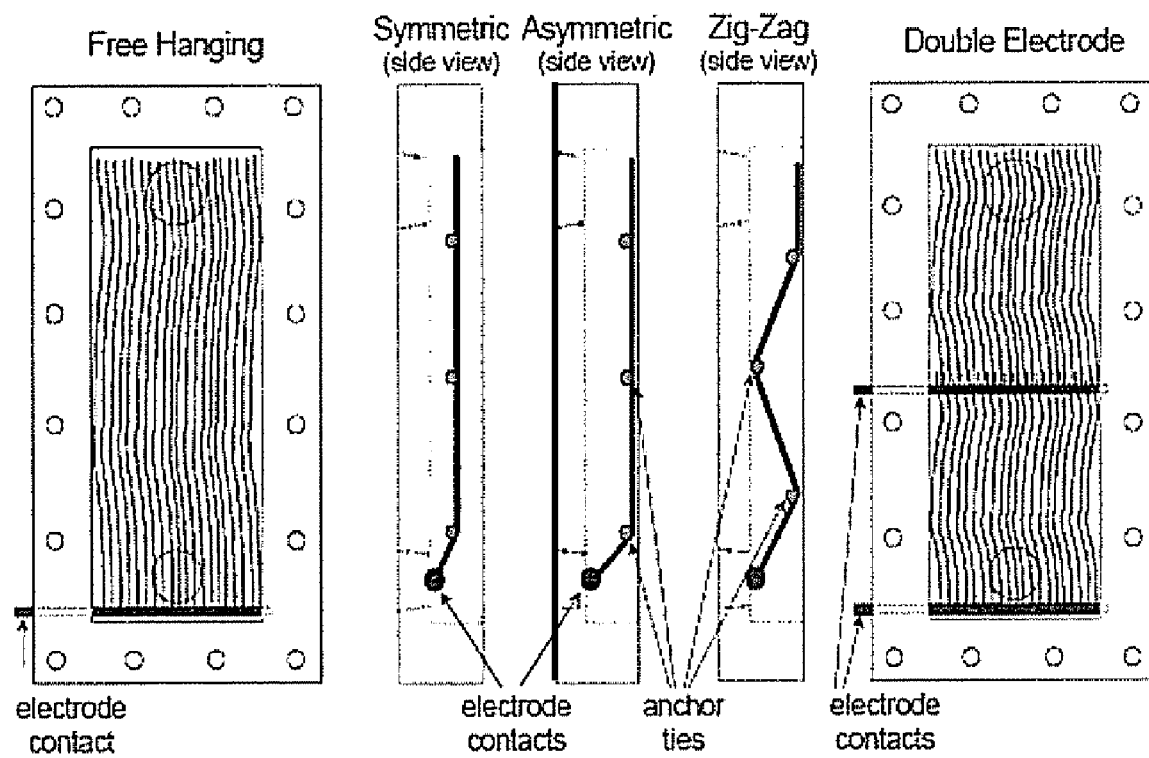
FIG. 3 illustrates different cathode configurations.

The catholyte chamber 206 is preferably coupled to at least one cathode 210. In certain embodiments, the cathode 210 is in fluid communication with the catholyte inside the catholyte chamber 206. The cathode 206 may comprise any suitable material such as carbon, graphite, glassy carbon, reticulated vitreous carbon, carbon felt, gold, or combinations thereof. Preferably, cathode 206 is a conductive and catalytically active material. Preferably, the cathode 210 comprises carbon fiber cloth. The carbon fiber cloth cathode may be freely hanging or anchored. In a specific embodiment, the carbon fiber cloth is hung from a glassy carbon rod. Other rod materials include, without limitation, titanium, anodized titanium, zirconium, or anodized zirconium. Additionally, the cathode 210 may comprise a double layer of carbon fiber cloth. In further embodiments, the cathode 210 is anchored by a plurality of electrode contacts. In such embodiments, the cathode 210 may be anchored in a variety of configurations (see FIG. 3). Examples of different cloth configurations include without limitation, zig-zag, symmetric, asymmetric, etc.

In an embodiment, the anode 208 is disposed adjacently an anode membrane 212 while the cathode 210 is disposed adjacently a cathode membrane 214. The anode and cathode membranes 212, 214 are preferably polymeric cation exchange membranes. Such membranes are typically commercially available from companies such as DuPont. Examples of suitable membranes include without limitation, fluorinated sulfonic acid copolymers, Nafion, Ultrex, or combinations thereof.

Generally, the central chamber 204 is disposed between the anode membrane 212 and the cathode membrane 214. Furthermore, the anode and cathode membranes 212, 214 are typically in fluid communication with the medium inside the central chamber 204. In some embodiments, the central chamber 204 comprises a central chamber outlet 232 and inlet 234. Although the central chamber inlet 232 and outlet 234 are shown to be in a vertical configuration with respect to the central chamber 204, they may also be configured transversely to the central chamber. The central chamber 204 serves to prevent anions (i.e. chloride or bromide) in the catholyte chamber 206 from migrating to the anolyte chamber 202 to form unwanted products such as chlorine. Thus, the primary advantages of the 3-chamber cell are improved control over peroxide production and no limitations of the solution species present in the central chamber.

In at least some embodiments, a gasket is disposed between each of the aforementioned elements to ensure a tight seal (not shown). For example, a gasket may be disposed between the anode 208 and the anolyte chamber 202 as well as between the anode 208 and a first membrane 212. Each gasket may comprise any suitable material such as Viton, PVC foam, silicone rubber, various natural or synthetic materials, or combinations thereof.

Figure 4:
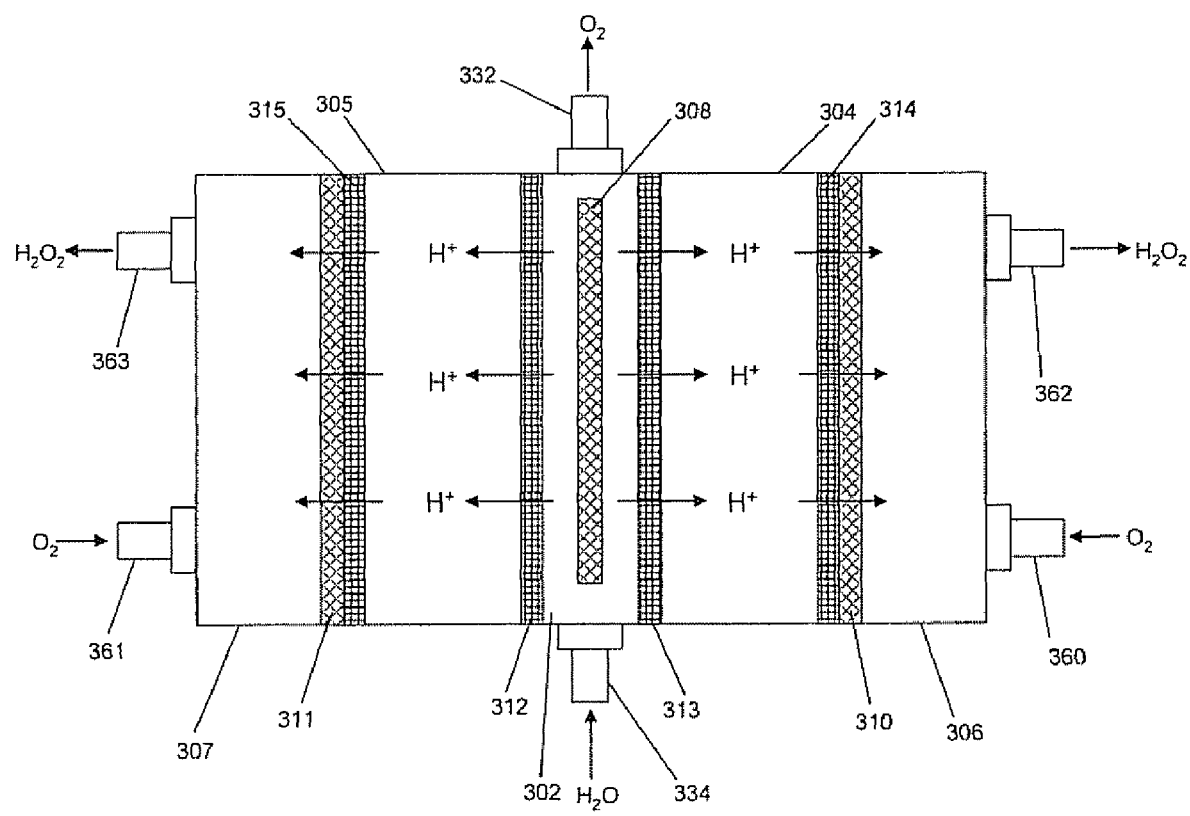
FIG. 4 illustrates another embodiment of an apparatus for the production of hydrogen peroxide.

In an alternative embodiment, the apparatus includes at least first and second catholyte chambers 306, 307, at least first and second central chambers 304, 305, and an anolyte chamber 302 (FIG. 4). The chambers are stacked upon each other to form the symmetric configuration shown in FIG. 4. In an embodiment, two central chambers 304, 305 flank the anolyte chamber 302 such that the anolyte chamber 302 is disposed between a first and second central chamber 304, 305. Each central chamber 304, 305 comprises central chamber inlets and central chamber outlets to allow flow of a medium through each central chamber 304, 305 (not shown).

Typically, the anolyte chamber 302 houses at least one anode 308. Alternatively, the anolyte chamber 302 may be flanked on either side with a first and second anode (not shown). In at least one embodiment, first and second anode membranes 312, 313 are disposed in between the first and second central chambers 304, 305 and the anolyte chamber 302, respectively. The first and second anode membranes 312, 313 generally are in fluid communication with the anolyte in the anolyte chamber 302. The anolyte chamber also generally comprises an anolyte inlet 334 and outlet 332.

Furthermore, two catholyte chambers 306, 307 are disposed adjacent to the two central chambers 304, 305 to form the outer "layers" of the stack. First and second cathode membranes 314, 315 are disposed between each catholyte chamber 306, 307 and each central chamber 304, 305, respectively. Furthermore, each catholyte chamber 306, 307 is coupled to a cathode 310, 311. In particular embodiments, each cathode 310, 311 is adjacent to a cathode membrane 314, 315. Thus, the one anode 308 is effectively used in conjunction with two cathodes to produce hydrogen peroxide. Additionally, each catholyte chamber comprises respective inlets 360, 361 and outlets 362, 363. The aforementioned 5 chambered configuration is only one of many variations of the "stacked" design. The apparatus may utilize any suitable configuration and number of anolyte chambers, central chambers, and catholyte chambers.

The cell stack design may provide a more compact electrolytic cell and may reduce the use of expensive anode in half. Protons may be driven more efficiently from the anode chamber into the central chamber and to the cathode. Without being limited by theory, this improvement may be due to having twice as much membrane area and twice the electric field strength to drive ion migration.

FIG. 2 also depicts an embodiment of a process for the on-site production of hydrogen peroxide. In this embodiment, a catholyte feed stream 260 containing an oxygen containing gas enters the catholyte chamber 206 through the catholyte chamber inlet 246. The catholyte feed stream 260 also comprises an electrolyte such as an electrolyte containing sodium chloride and/or other suitable ions in solution. Suitable catholyte electrolytes include halide solutions, seawater, brine solutions, and effluents and streams containing chloride ions. The catholyte may also contain inert components such as organics and particulates. The catholyte may also contain (or be comprised of) caustic solution or acid solution. The anolyte feed stream 270 enters the anolyte chamber 202 through the anolyte chamber inlet 240. In general, the anolyte feed stream 270 comprises an inert electrolyte dissolved in water. Examples of suitable inert electrolytes include without limitation, sodium sulfate, potassium sulfate, sodium phosphate, potassium phosphate, sodium citrate, potassium citrate, sodium acetate, potassium acetate, sodium nitrate, potassium nitrate, hydrochloric acid, hydrobromic acid, hydrogen potassium sulfate, sulfuric acid, nitric acid, citric acid, acetic acid, or combinations thereof. The anolyte thus comprises any inert salt in which the anion will not react with the anode. In typical embodiments, the catholyte and anolyte feed streams 260, 270 are countercurrent to each other. Alternatively, the catholyte and anolyte streams are cocurrent. Similarly, the electrolyte flow in the central chamber 204 can be either cocurrent or counter-current to the outer chambers in all possible combinations.

In general, an electric current is applied to the anode and cathode from an external power supply. The oxygen in the catholyte feed stream 260 is thereby reduced at the cathode 210 to form $HO_2^-$ peroxide ion. The $HO_2^-$ peroxide ion reacts with excess $H^+$ to form $H_2O_2$ which exits at a catholyte chamber outlet 244 in catholyte chamber exit stream 262. The $H_2O$ in the anolyte chamber 202 is oxidized at the anode 208 to form $H^+$ protons and $O_2$. The produced $O_2$ exits at the anolyte chamber outlet 242 in the anolyte exit stream 272. The generated $H^+$ protons selectively pass through the anode and the first membrane into the central chamber. The $H^+$ protons further pass through the cathode membrane 214 and cathode 210 into the catholyte chamber 206 to provide excess protons for $H_2O_2$ production.

The use of polymer electrolyte membranes between the anode 208, central chamber 204, and cathode chamber 206 allows protons produced at the anode 208 to pass through the central chamber 204 to the cathode 210 to promote the production of hydrogen peroxide. Additionally, the presence of a small amount of chloride at the cathode 210 ($\sim 1 \times 10^{-5}$ Molar concentration) may enhance hydrogen peroxide production. Without being limited by theory, this production enhancement may occur because chloride, unlike other anions, can absorb onto the cathode surface and enhance the catalytic activity.

The electrolytic production of hydrogen peroxide consumes oxygen supplied through aeration with compressed air. The progression of the cathodic and anodic electrochemical reactions in conjunction with the separated electrolytes typically results in the catholyte becoming basic and the anolyte becoming acidic. The central chamber 204 is capable of mediating the rate of the proton migration and becomes acidic as well. The central chamber exit stream 282 is not contaminated with species produced from the catholyte chamber 206 (or vice versa) due to the cation-selective barrier nature of the polymer membrane that allows protons to selectively migrate from the anode to the cathode while preventing appreciable migration of neutral species like $H_2O_2$ or anions between the electrolytic cell chambers. Generally, the result is an acid solution in the anolyte chamber 202 and central compartment 204 and an alkaline solution containing hydrogen peroxide in catholyte chamber 206. These solutions contain the chemicals needed for various cleansing and disinfecting applications.

Referring still to FIG. 2, a central chamber feed stream 280 is fed to the central chamber through the central chamber inlet 234. The central chamber feed stream 280 may comprise any suitable electrolytic medium such as sodium sulfate solution or an acid buffer. Other examples of a suitable electrolytic medium include without limitation, sodium citrate, potassium sulfate, sodium phosphate, potassium phosphate, or combinations thereof.

Figure 5:
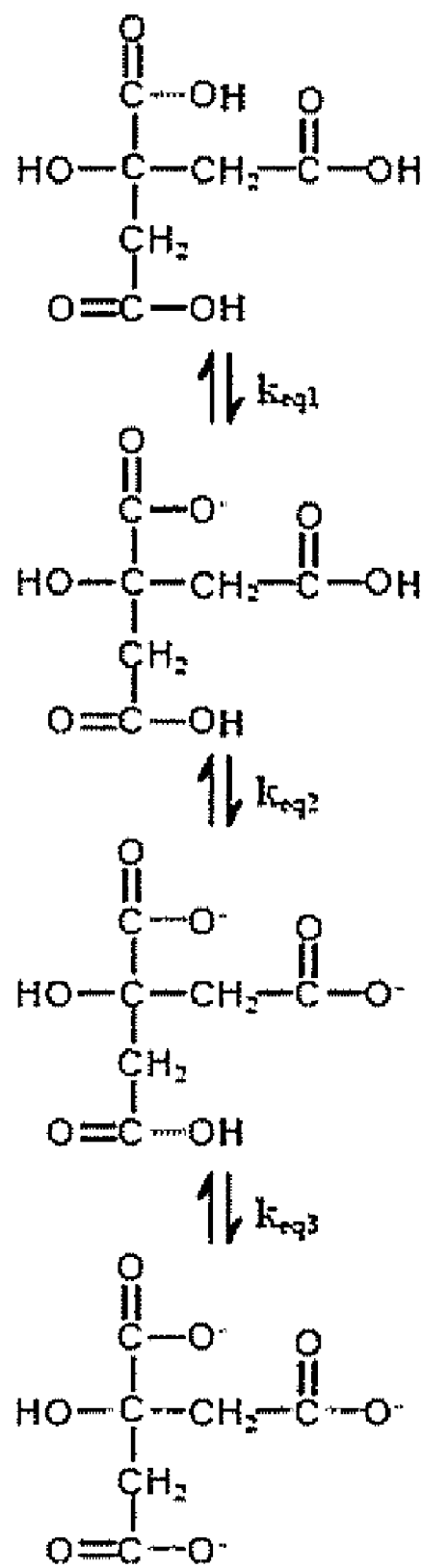
FIG. 5 illustrates the equilibrium between the ionized and molecular forms of sodium citrate.

In a particular embodiment, the electrolytic medium in the central chamber becomes acidic as protons from the anolyte chamber migrate into the central chamber. For example, the central chamber feed stream 280 may comprise sodium citrate. Sodium citrate ($C_6H_5Na_3O_7$) is the sodium salt of the tricarboxylic acid that possesses three acidic protonation sites, each with its own dissociation constant (pK1=3.14, pK2=4.77, pK3=6.39 at 20° C.). There is an equilibrium between the ionized and molecular forms illustrated in FIG. 5 due to its weak acid nature.

As ionized protons (free $H^{3O}$) are removed from solution (consumed) the remaining molecular form of the acid group ionizes more to maintain the equilibrium of free protons. As a result the number of free protons in solution, and the pH, does not change significantly until the molecular form is substantially depleted. This behavior causes the pH shift of the central chamber to proceed at a much slower rate due to the three buffering equilibria of the citrate anion. The citrate anion associates with the protons from the anolyte chamber 202 to form citric acid which exits at the central chamber outlet 232 in the central chamber exit stream 282. Additionally, the central chamber feed stream 280 and the anolyte feed stream 270 may comprise the same composition such that the central and anolyte feed streams 280, 270 are fed with a single feed stream.

The central chamber 204 additionally serves to prevent reactive anions such as chlorine anions from migrating to the anolyte chamber 202. As the central chamber feed stream 280 is fed into the central chamber and exits the central chamber, the solution passing through the central chamber sweeps away any reactive anions that have migrated from the catholyte chamber 206.

In other embodiments, the central chamber 204 is used to control the pH balance between the catholyte chamber 206 and the anolyte chamber 202. For example, the central chamber feed stream 280 may comprise an acid buffer and/or a sodium or potassium containing electrolyte. The acid buffer and/or sodium or potassium containing electrolyte that enters the central chamber 204 lessens the number of protons entering the catholyte chamber 206. Consequently, more hydroxide is formed at the catholyte chamber 206 causing the catholyte to become basic. The pH in the catholyte chamber 206 and the anolyte chamber 202 is imbalanced such that the pH in the catholyte chamber 206 is higher than the pH in the anolyte chamber 202. The catholyte chamber exit stream 262 thus comprises a caustic solution of hydrogen peroxide.

A benefit of the caustic hydrogen peroxide solution is that it is very effective in destroying contaminating microorganisms such as bacteria. Some common bacteria analyzed for in dairy products are *Coliform, E. coli, Salmonella, Listeria, Coagulase*, and *Staphylococci*.[22] These bacteria can be effectively eliminated by the combination of alkaline pH and hydrogen peroxide generated by the above electrolysis cell. Treatment of filtration units with alkaline hydrogen peroxide solutions has resulted in rapid biofilm disruption by alkaline solutions of 1000 ppm $H_2O_2$ while more than 99.99999% (7 log kill) of the slime forming *Pseudomonas cepacia* was eliminated. Increasing either pH or hydrogen peroxide content may enhance the effectiveness of the kill level. Neutral $H_2O_2$ solutions at these concentrations alone are not nearly as effective, therefore the combination of both high pH and $H_2O_2$ is required. Bacterial kill levels of $\geq 7$ log are appropriate for drinking water standards that require bacteria to be at undetectable levels (<1/mL). Drinking water kill levels set by the EPA for spores (*Cryptosporidium*), cysts (*Giardia lamblia*), and viruses are required to be 2, 3, and 4 log, respectively.

Dairy Filtration Membrane Cleaning

The alkaline solution and hydrogen peroxide generated by the above described methods and apparatus are expected to be effective at removing membrane-fouling protein films. In an embodiment, NaOH and/or KOH is produced from the apparatus. NaOH and KOH are standard strong alkaline cleaning agents currently in use and can be produced by the apparatus to make solutions of up to pH 14. These pH levels are suitable for breaking up membrane-fouling protein films. In some embodiments, for membranes requiring milder alkalinity, the acid generated by the central chamber can be used to adjust the pH. The presence of hydrogen peroxide increases the protein film-breaking power of the alkaline solution when it decomposes at the fouled membrane producing effervescent bubbles of dioxygen. This anti-fouling effect of gas effervescence has been noted previously in hydrogen peroxide treatments of fouled membranes in the presence of a peroxide-decomposing enzyme and for whey protein feed streams that have been injected with air. Without being limited by theory, it is believed that the presence of air bubbles increases the mass transfer rate due to a higher velocity in the membrane tubules resulting in greater shear force at the membrane surface, thus reducing fouling problems. The presence of gas bubbles during the cleaning process of bio-fouled membranes resulting from the decomposition of hydrogen peroxide has been observed to have a similar benefit of increased cleaning power over pure alkali.

In a preferred embodiment, a catholyte feed stream 260 comprising sodium chloride, potassium chloride, sodium acetate, potassium acetate, sodium nitrate or potassium nitrate solution, or combinations thereof, aerated with compressed air is run through an embodiment of the apparatus to generate a hydrogen peroxide cleansing solution. The anolyte feed stream 270 is typically comprised of an inert salt such as sodium sulfate to prevent chlorine formation at the anode 208. Furthermore, the pH's of the catholyte chamber 206 and the anolyte chamber 202 are imbalanced such that the catholyte exit stream 262 is caustic or alkaline. In certain embodiments, an excess of cations may be fed into the anolyte chamber 202 in the anolyte feed stream 270 to promote pH imbalance. As previously explained, the central chamber feed stream 280 may also comprise an acid buffer and/or a sodium or potassium containing electrolyte to promote pH imbalance. Generally, as the electrochemical reactions at the cathode and anode proceed, the solution in the central chamber becomes more acidic. As a result, an acid solution such as citric acid, acetic acid, nitric acid, or combinations thereof, is produced in the central chamber exit stream 282. The acid solution in the exit stream 282 that is generated from the central chamber 204 is used for removal of mineral deposits and milkstone. The produced acidic and hydrogen peroxide cleansing solutions may be stored in reservoirs for later cleaning of dairy filtration membranes and sanitary process equipment or may be used for "on the fly" cleaning of the membranes. An acid solution, such as that produced at the central chamber or mixed from bulk acid sources, may be used to produce acidic solutions containing hydrogen peroxide as a disinfectant solution. This disinfectant solution may be used for disinfecting dairy filtration membranes and sanitary process equipment. This disinfectant solution is preferably comprised of acetic acid and hydrogen peroxide. Additionally, the production of hydrogen peroxide in the presence of acetic acid at the cathode chamber can lead to the production of peroxyacetic acid disinfecting solutions. Peroxyacetic acid is a mixture comprising acetic acid, peracetic acid, hydrogen peroxide and water. Peroxyacetic acid is an FDA approved disinfecting solution widely used in the dairy, food, beverage, meat processing industries.

Bilge and Ballast Water Treatment

In another embodiment, the described methods and apparatus may be used to clean bilge and ballast water from a ship. The discharge of surface vessel bilge and ballast water upon destination arrival may seriously contaminate the surrounding water with organics and/or metal particulates or nonindigenous viable biological organisms and represents an extremely pervasive and expensive problem in today's highly mobile society. The most problematic organisms to be controlled in this application will be bacterial, planktonic, and egg or larval stages of higher organisms as macroorgamisms can be readily removed by existing prefiltration technologies. Typically it is nearly impossible and very expensive to control/eradicate an infestation after introduction. Thus prevention of the initial contamination is paramount since once exotic species are introduced and have become established, eradication necessarily involves significant damage to the environment containing them.

In this embodiment, the catholyte feed stream 260 comprises filtered ballast (seawater or freshwater). However, unlike the dairy filtration membrane cleaning, the catholyte exit stream 262 is preferably at a neutral pH suitable for disposing the ballast water back into the ocean. In order to neutralize the pH in the catholyte chamber 206, the anolyte may comprise an acidic solution. Without being limited by theory, by feeding in an acidic solution to the anolyte chamber 202, an excess of $H^+$ protons may be produced which may migrate to the catholyte chamber 206. The excess of $H^+$ protons may neutralize the hydroxyl ions formed at the cathode. As described above, the peroxide containing solution in the catholyte exit stream 262 sterilizes and/or purifies the ballast/bilge water.

In further embodiments, the disclosed methods and apparatus may be used for numerous other applications including without limitation, treating cooling tower water, wastewater treatment, swimming pool disinfection, filter plant cleaning, oilfield waterflood treatment, etc.

The operating pH for hydrogen peroxide production in each of the applications above is defined by the application requirements.

Dairy Filtration Membrane Cleaning utilizes caustic hydrogen peroxide solutions of approximately pH 12-13 (point of use pH) or concentrates of up to pH 14 that are diluted to the desired point of use pH. Also, acidic hydrogen peroxide solutions are utilized having approximately pH 2.5-3.5 (point of use pH) or concentrates of down to pH 1 that are diluted to the desired point of use pH.

Bilge and Ballast Water Treatment operating pH is the natural pH of water, typically in the range of pH 7-9, and cannot exceed pH 9.5.

Cooling Tower Water Treatment operating pH is in the typical range of pH 6-9.

Wastewater Water Treatment operating pH is in the typical range of ph 6-9 with excursions outside of this range depending on effluent being treated.

Oilfield Floodwater Treatment operating pH is similar to that of seawater (typically used as flood water) in the typical range of pH 7-9.

Drinking Water Treatment operating pH is typically in the range of pH 7-8.8.

To further illustrate various illustrative embodiments of the present invention, the following examples are provided.

EXAMPLE 1

Micro-Flow Electrolytic Cell Design

In this example, the micro-flow cell was designed to have a geometric electrode area of 47 cm². It was used to prove hydrogen peroxide production is effective in the three-chamber configuration (in contrast to two-chambers) and to determine effects of electrolyte concentrations on performance. The overall dimensions of the cell when assembled were 5.25"×6.5"×2.625". Quick disconnect fittings were used on the catholyte (0.75" NPT) and anolyte (0.5" NPT) inlets and outlets. The central chamber used 0.375" compression fittings adapted down to a #10-32 thread due to the narrow width of the central chamber flow frame.

Cathode Preparation (Micro-flow Cell)

The cathode was constructed of commercially available carbon cloth (De-Comp Composites 3k plain weave carbon cloth, FG-3k) that was mounted in a polycarbonate frame. This frame was face sealed with Viton gaskets in the cell.

The carbon cloth cathode was made by sandwiching the carbon cloth between two supporting polycarbonate rings (0.0625" opening. The two rings were adhered together with a copious application of IPS Weld-On #16 plexiglass and acrylic sheet adhesive (IPS Corp.). A tab of carbon cloth weave protruded through the side of the frame and a folded strip of copper pressed onto the tab for a dry electrical contact. The carbon cloth weave was L-cut on two sides (top and side opposite to electrical contact tab) allowing free movement of the fibers in the catholyte flow. The carbon cloth and cathode preparation are described below.

Dry carbon cloth was cut to the appropriate size (3"×4.625" for micro flow cell) with a 1" tab that extended about 0.5" beyond the edge of the cathode frame. The carbon cloth was cleaned with acetone to remove the organic binder on the cloth. The cloth was rolled up and submerged in acetone in a polyethylene or polypropylene bottle for 1 hour and gently agitated before removal. The cloth was placed into a second acetone rinse and gently agitated so as not to unravel the weave. The cloth was then spread out and rinsed thoroughly with deionized water.

The carbon cloth was soaked in hydrogen peroxide solution to remove any remaining organics from the surface. The cloth was soaked in 3% hydrogen peroxide (as sold for household use) overnight, but no more than 18 hours in a polyethylene or polypropylene bottle. The cloth was rinsed thoroughly with deionized water and was stored in a bottle of deionized water until use.

The cloth was dried with paper towels prior to gluing into the cathode. A generous amount of the IPS Weld-On adhesive was spread onto one surface of one acrylic mounting ring. The dried carbon cloth was centered on the mounting ring and a bead of additional adhesive as added to the weave being sealed into the frame (especially the tab for electrical contact) to ensure a good seal through the weave. The second mounting ring was placed on top and the entire frame was pressed under a weighted board for at least 2 hours to ensure the entire frame has bonded together. The cathode adhesive was dried overnight before use. The cathode was stored in a plastic bag.

Anode Preparation (Micro-flow Cell)

The anode was a commercially available dimensionally stabilized anode (DSA) that was optimized for oxygen production (EC-600, Eltech Systems Corp.). This was constructed of an expanded titanium mesh (0.040" thickness) covered with a tantalum-doped iridium oxide coating. The DSA dimensions were cut about 0.375 inches larger (on all sides) than the anolyte flow chamber interior (2"×3.625") for face sealing against Viton gaskets. A tab of the DSA that extends beyond the cell body was used for a dry electrical contact. The DSA can be cut with tin snips and the edges sanded smooth with silicon carbide Emory cloth to remove sharp points that will puncture the gasket seals or membranes.

Polymer Electrolyte Membrane Preparation (Micro-flow Cell)

The polymer electrolyte membrane (PEM) used was commercially available Nafion-324 (CG Processing, Inc.). This Nafion membrane type had a Teflon reinforcing fiber weave and a directional bias toward cation migration that was somewhat selective for protons (H+). These membranes were able to handle up to 2 A/cm² before ohmic losses become significant, which was far greater than the current density used in the electrolytic cell. The procedure used for Nafion membrane preparation is described below.

The dry Nafion membrane (as received) was cut using a straight edge razor or clean scissors to 2.5"×4.125" (the Nafion expands some during preparation). The Nafion was boiled in 3% hydrogen peroxide (general consumer grade) while being held flat in a plastic frame (similar to the cathode frame) assembled with Nylon or Teflon screws. The Nafion-324 was reinforced with Teflon fibers that will cause the membrane to curl during hydration, which results in making them difficult to handle. Approximately 900 mL of 3% hydrogen peroxide was added in a 1 Liter beaker. The solution was slowly stirred with a Teflon coated magnetic stir bar while heating. A watch glass (not a metal foil) was placed over the top of the beaker to prevent excessive evaporation. Deionized water was added as necessary to maintain the starting volume. The membranes were added to the boiling solution and a slow boil was maintained for 1 hour to remove organic contaminants and hydrate them.

The Nafion was rinsed with deionized water after boiling. The Nafion was rinsed in a solution of 0.1 Molar sulfuric acid in a polyethylene or polypropylene bottle. The Nafion membranes were rinsed with deionized water prior to installing in the electrolytic cell to prevent cracking. The membranes extended about ⅔ of the way over the Viton gaskets to seal and were trimmed if necessary with clean scissors.

Electrolytic Cell Gaskets (Micro-flow Cell)

The gaskets used to seal the components of the micro-flow cell were cut from 0.0625" thick Viton sheet (McMaster-Carr). Six gaskets were required. The outer dimensions were 4.25"×5.75" (small enough to clear the bolt holes of the cell) and the inner dimensions were the same as the flow chamber (2"×3.625"). The Viton gaskets were thoroughly washed with soap and water and soaked for 4 hours in 3% hydrogen peroxide. These were stored in a plastic bag.

Assembly of the Micro-Flow Cell

The micro flow cell was assembled by stacking the components, starting with the catholyte chamber, being sure to align each component carefully. The overall order of components was:

anolyte chamber
gasket
DSA
gasket

Nafion
gasket
central chamber
gasket
Nafion
gasket
carbon cloth cathode
gasket
catholyte chamber The Nafion-324 had a directional bias to cation migration so the shiny, textured side was oriented toward the anode. The Nafion perimeter was sized between the inner and outer diameters of the gaskets.

The DSA was placed so that a continuous line of mesh intersections was followed around the perimeter so they fell inside the outer diameter of the gasket to ensure a water tight seal.

The cell used six ¼-20 thread×3" long 316-stainless steel bolts with washers on both sides. The following procedure was used to tighten the cell bolts without cracking the cell or applying excess pressure. The cell was tightened down to 40 inch-lbs with a torque wrench. Then tightened to 40 inch-lbs, after 20 minutes, tightened to 30 inch-lbs, after another 20 minutes, finally tightened to 35 inch-lbs.

After the cell has been assembled some deionized water was added to the three chambers to keep the membranes wet.

2x Electrolytic Cell Design

The 2x electrolytic cell was fabricated with 2x the geometric cathode area (96 cm$^2$) of the micro-flow cell to investigate the effects of scale-up, carbon cloth density, continue to optimize cell performance and produce cleaning solutions for testing on fouled membranes. Several modifications were made from the micro-flow cell design. The DSA was recessed into the anolyte flow chamber to eliminate the need for one gasket and position the anode in close contact with the PEM (Nafion) for better proton transfer. The carbon cloth cathode frame was eliminated by hanging the cloth, like a curtain of seaweed, on a glassy carbon rod that serves as the electrical contact. This modification eliminated the tedious process of mounting carbon cloth into polycarbonate frames, which leaked after a week of use. This also eliminated another gasket from the cell and made for a more mechanically robust and leak flee system. The overall dimensions when assembled were 5.25"×11.5"×2.44". Quick disconnect fittings were used on the catholyte (0.50" and 1.0" NPT) and anolyte (0.5" NPT) inlets and outlets. A larger orifice on the exit port of the cathlolyte cell chamber prevented limiting the flow rate with the fluid lines. The central chamber used 0.375" compression fittings adapted down to a #10-32 thread due to the narrow width of the central chamber flow frame.

The recess for the carbon rod (mounted in the bottom of the catholyte flow chamber that the carbon cloth cathode hangs from) was further modified after machining the cell body. The upper edge of the ¼" recess at the catholyte flow chamber inlet was ground to a smooth radius using a rotary tool and new abrasive drum sander attachment.

A ⅛" compression fitting with ⅛" NPT made of Kynar was installed into the countersunk hole on the side of the catholyte chamber to seal the carbon rod in place. A short length of carbon rod extends out of the fitting for electrical contact. A Kynar fitting was used for its heat tolerance because the single dry contact (glassy carbon rod external to the cell) becomes hot at high cell currents. The majority of the glassy carbon rod was internal to the cell and was cooled by the catholyte flow.

Cathode Preparation (2x Cell)

The cathode was made of the same carbon cloth as for the micro-flow cell above, but from a piece of cloth twice the length of the cell. The cloth was mounted in the cell under a glassy carbon rod (3 mm diameter×100 mm, type 1, Alfa), the short cross weave was removed, and the remaining long strands were folded back. This gave the same carbon cloth fiber density as a single length piece of cloth with the cross weave. One benefit of this design was that multiple layers of carbon cloth can be easily installed.

The cloth was prepared as described above in steps 1, 3, and 4 for Cathode Preparation (micro-flow cell). The carbon cloth was cut to dimensions of 3"×14". The following procedure describes the installation of the carbon cloth into the catholyte chamber:

A 2.875"×0.125"×~0.1875" Viton strip was placed in the bottom of the recess for the glassy carbon rod. This strip held the carbon cloth against the glassy carbon rod. The carbon cloth length-wise was laid over the flow chamber with its mid-point centered over the recess for the glassy carbon rod. The glassy carbon rod was inserted through the ⅛" compression fitting and across the top of the carbon cloth weave. A pair of blunt-nosed tweezers was helpful in holding down the fibers against the Viton strip during this step. The glassy carbon rod was inserted into the supporting hole on the opposite side of the chamber about ⅛". The compression fitting nut was carefully tightened on the glassy carbon rod ensuring the rod did not bottom out in the supporting hole causing it to shatter. All the cross weave from the cloth was removed. 4-6 strands at a time were pulled from the side to avoid bunching the cloth. The remaining carbon cloth was folded back on itself and trimmed with clean scissors to just below the exit port of the chamber.

Anode Preparation (2x Cell)

The anode was made the same way as described for the micro-flow cell above. The DSA (2.438"×8.625" with a 1.0" wide×2" long tab to extend out of the cell) was cut to fit in the 0.045" deep recess around the rim of the catholyte flow chamber. The tab of the DSA that extends beyond the cell body was used for a dry electrical contact. This tab was sealed by a small piece of gasket fitted in the recess in the cell body.

Polymer Electrolyte Membrane (PEM) Preparation (2x Cell)

The PEM was prepared in the same manner as described for the micro-flow cell above. The Nafion was cut to dimensions of 2.687"×8.8751". The membranes were boiled in 3% hydrogen peroxide the same way as described above, except the long membranes were wrapped around the outside of a medium-sized beaker (~200 mL) or large glass ring to prevent excessive curling.

Electrolytic Cell Gaskets (2x Cell)

Viton is an expensive material ($48/ft$^2$) and, therefore, a more economical substitute was found, which was weather resistant PVC foam, ⅛", plain back ($0.71/ft$^2$). The PVC foam gaskets were cut to the full outer dimensions (5.25"× 11.5") of the electrolytic cell and the inner dimensions (2.1875"×8.375") were the same as the flow chamber. Holes must be cut in the gaskets to accommodate the bolts. This was done by using a hole punch to create the bolt hole pattern of the cell in the gaskets.

Assembly of the 2x Electrolytic Cell

The 2x electrolytic cell was assembled by stacking the components, starting with the catholyte chamber. Care should be taken in aligning the components, but tolerances were not as critical in this improved design. The overall order of components was:
- anolyte chamber
- DSA
- gasket
- Nafion
- gasket
- central chamber
- gasket
- Nafion
- gasket
- carbon cloth cathode
- catholyte chamber The Nafion-324 had a directional bias to cation migration so the shiny, textured side was oriented toward the anode. The Nafion perimeter extended onto the gaskets.

The DSA was internal to the anolyte chamber except for the tab for electrical contact. A square of gasket was cut to fit the back of the recess that accommodates the DSA tab.

The cell used sixteen ¼-20 thread×3" long 316-stainless steel bolts with washers on both sides. The following procedure was used to tighten the cell bolts without cracking the cell or applying excess pressure. The cell was tightened down to 40 inch-lbs with a torque wrench. Then tightened to 40 inch-lbs, after 20 minutes, tightened to 30 inch-lbs, after another 20 minutes, finally tightened to 35 inch-lbs.

After the cell has been assembled, some deionized water was added to the three chambers to keep the membranes wet.

EXAMPLE 2

3 Chamber Electrolytic Cell Performance Optimization

The performance of the three chamber micro-flow electrolytic cell was evaluated. The primary goal was to identify and to optimize the most influential parameters on production. This task was performed in three stages. The first was establishing base-line cell performance and experimental techniques with the three chamber micro-flow cell. The second stage was testing the effects of different experimental parameters using the three chamber micro-flow cell. The third stage was testing the most favorable conditions to achieve the application requirements of this program with the 2x cell. Results for each of these stages are presented below after describing the experimental setup.

1. Experimental Setup and Procedures

Each chamber of the cell was plumbed into a reservoir and the reservoir contents circulated through the cell by either a high flow March pump (model TE-5C-MD) with polypropylene pump head (Centennial Equipment TE-SC-MD, polypropylene wet end kit) at a flow rate around 15 L/min or a peristaltic pump (Masterflex 7518-00) at flow rates of 0-0.20 L/min. System controls and monitoring were essentially automated for safety and ease of operation. The power supply for the electrolytic cell was a Hewlett Packard (model E3632A) DC power supply (0-15 V, 7 A/0-30 V, 4A). A Hewlett Packard (model 34970A) data acquisition-switch unit was used to acquire data from system sensors and record them on a Windows operating system with the Agilent BenchLink Data Logger software. System sensors include a pH electrode (Omega, PHE-1411, gel filled, double junction, Ag/AgCl) and thermocouple (Omega, CASS-18G-12-PFA, ⅛" K-type, PFA Teflon coated) for each reservoir (pH readings were corrected for temperature), voltage output of the power supply, and voltage output of the air flow meter (Omega FLR1005). Each pH electrode was powered by an in-line battery powered pre-amplifier (Omega PHTX-21). A relay switch box with water sensors (fabricated in house) was used to distribute AC power to the DC power supply and pumps so that the system would be automatically shut down in the event of a leak. All fittings, valves, and quick disconnects were polypropylene or PVC. The large March pumps use ¾" braided Nylon tubing while the peristaltic pumps use PharMed polypropylene tubing (#17). The air inlet line was polyethylene tubing after the regulator and filter.

General system operation occurred by circulating the cell chamber reservoir contents through the cell at the appropriate flow rates. Air was aspirated into the catholyte feed line using a gas dispersion tube (Ace Glass 7202-20, type E) fitted in-line with a compression fitting. The DC power supply was set to the appropriate current (constant current mode) and attached to the cell electrodes being sure that the positive lead was on the anode and the negative lead was on the cathode. Catholyte, anolyte, and central chamber pH shifts were monitored by computer while the hydrogen peroxide concentration was monitored by titrating 5 mL samples periodically.

The pH electrodes were periodically calibrated using the standard three-point calibration method with pH 4.00, 7,00, and 10.00 standard solutions (VWR, pH buffer solutions). The pH electrodes were stored in saturated KCl solution when not in use. The hydrogen peroxide titration was made using titration reagents available from HACH, Inc. The titration procedure was as follows: A 5.00 mL sample (using a volumetric pipette) of the catholyte was removed and deposited in a 50 mL beaker with magnetic stir bar. 2 mL of ammonium molybdate reagent (HACH 1933-53) was added and stirred with a magnetic stir plate. A yellow color appeared in the presence of $H_2O_2$. The contents of one sulfite reagent powder pillow (HACH 2203-99) was added to the stirring solution. A dark purple-brown color appeared indicating the presence of $H_2O_2$. Using a burette, 0.01 N sodium thiosulfate (HACH) was added dropwise until an abrupt color change from purple to nearly colorless persisted. The titration required 0.283 mL of titrant per 1 ppm of $H_2O_2$.

Specific experimental parameters and hydrogen peroxide production results for each electrolytic cell experiment (reservoir volumes, electrolyte content, electrolyte concentration, electric current, $H_2O_2$ production rate, Faradaic efficiency, etc.) are summarized in Table 1. Faradaic efficiency was calculated by taking the ratio between the actual amount (in moles) of peroxide produced and the theoretical amount produced (current or charge passed run time 2 mol of e– per $H_2O_2$) times 100%. Examples of specific experimental data for pH shifts and hydrogen peroxide production are presented in the following sections.

TABLE 1

Summary of Electrolytic Cell Performance Trials
Micro-Flow Cell Experiments

| Trial # page-exp. | Experimental Conditions (all at 860 mA, DSA anode, centralchamber flow 100 mL/min., unlessnoted) Electrolytes C: Catholyte CC: Central Chamber A: Anolyte | PEM and Cathode (bold = new) | Run Time (hr) | Final $H_2O_2$ Conc. (ppm) | Avg. $H_2O_2$ Rate (mg/h cm2) | Ave. Faradaic Efficiency (%) | Results Final pH C: Catholyte CC: Central Chamber A: Anolyte | Final Cell Voltage (V) | Comments |
|---|---|---|---|---|---|---|---|---|---|
| *Preliminary Experiments* | | | | | | | | | |
| TR1 (7-1) | C: 0.1 M NaCl (4 L) CC: 0.1 M NaCl (0.5 L) A: 0.005 M Na2SO4 (4 L) | Nafion-324 3000k dry | 0.5 | 12 | 2 | 18 | C: 11.6 CC: ND A: ND | 3.7 | 3-chamber cell shakedown run 48 cm2 (9.5 cm × 5 cm) cathode until trial 13) |
| TR2 (7-2) | C: 0.1 M NaCl (4 L) CC: 0.1 M NaCl (0.5 L) A: 0.1 M Na2SO4 (4 L) | Nafion-324 3000k dry | 3 | 252 | 7 | 62 | C: 12 CC: ND A: ND | 3.8 | 3-chamber cell shakedown run |
| *Early Experiments (system contaminated)* | | | | | | | | | |
| 1 (8-1) | C: 0.1 M NaCl (4 L) CC: 0.1 M NaCl (0.5 L) A: 0.1 M Na2SO4 (4 L) | Nafion-324 3000k dry | 3 | 3 | 0.1 | 0.7 | C: 11.6 CC: 2.3 A: 2.9 | 4.3 | |
| 2 (8-2) | C: 0.1 M NaCl (4 L) CC: 0.1 M NaCl (0.5 L) A: 0.1 M Na2SO4 (4 L) | Nafion-324 3000k dry | 0.75 | 17 | 1.9 | 17 | C: 11.3 CC: 4.3 A: ND | 4.2 | |
| 3 (9-3) | C: 0.1 M NaCl (4 L) CC: 0.1 M NaCl (0.5 L) A: 0.1 M Na2SO4 (4 L) | Nafion-324 3000k dry | 0.5 | 0 | 0 | 0 | C: 10.9 CC: 4.0 A: 3.3 | 4.8 | DAC Data for central chamber and catholyte switched. |
| 4 (9-4) | C: 0.1 M NaCl (4 L) CC: 0.1 M NaCl (0.5 L) A: 0.1 M Na2SO4 (4 L) | Nafion-324 3000k dry | 0.25 | 5 | 1.7 | 15 | C: 10.8 CC: ND A: 3.2 | 5.6 | |
| 5 (10-5) | C: 0.1 M NaCl (4 L) CC: — A: 0.1 M Na2SO4 (4 L) | Nafion-324 3000k dry | 1.5 | 14 | 0.8 | 7 | C: 11.4 CC: — A: 2.6 | 3.5 | 2-chamber, catholyte pH not reading properly |
| 6 (10-6) | C: 0.1 M NaCl (4 L) CC: — A: 0.1 M Na2SO4 (4 L) | Nafion-324 3000k dry | 2 | 24 | 1 | 9 | C: 11 CC: — A: 2 | 3.6 | 2-chamber, |
| *Performance Optimization Experiments (vary anolyte concentration)* | | | | | | | | | |
| 7 (11-7) | C: 0.1 M NaCl (4 L) CC: — A: 0.1 M Na2SO4 (4 L) | Nafion-324 3000k dry | 0.5 | 40 | 6.7 | 59 | C: 11 CC: — A: 3 | 3.5 | 2-chamber, system totally rebuilt |
| 8 (11-8) | C: 0.1 M NaCl (4 L) CC: 0.1 M NaCl (0.5 L) A: 01 M Na2SO4 (4 L) | Nafion-324 | 4.8 | 201 | 3.5 | 31 | C: 11.5 CC: — A: 2.2 | 4.2 | 3-chamber, repeat conditions of trial 7 |
| 9 (12-9) | C: 0.1 M NaCl (4 L) CC: 0.1 M NaCl (0.5 L) A: 0.05 M Na2SO4 (4 L) | Nafion-324 | 3 | 105 | 2.9 | 26 | C: 11.4 CC: ND A: 2.5 | 4.3 | |
| 10 (13-10) | C: 0.1 M NaCl (4 L) CC: 0.1 M NaCl (0.5 L) A: 0.0005 M Na2SO4 (4 L) | Nafion-324 | 3 | 77 | 2.1 | 19 | C: 10.8 CC: 1.6 A: 3.1 | 11.6 | about 2 ppm H2O2 in central chamber |

TABLE 1-continued

Summary of Electrolytic Cell Performance Trials
Micro-Flow Cell Experiments

| Trial # page- exp. | Electrolytes C: Catholyte CC: Central Chamber A: Anolyte (all at 860 mA, DSA anode, centralchamber flow 100 mL/min., unlessnoted) | PEM and Cathode (bold = new) | Run Time (hr) | Final H2O2 Conc. (ppm) | Avg. H2O2 Rate (mg/h cm2) | Ave. Faradaic Efficiency (%) | Final pH C: Catholyte CC: Central Chamber A: Anolyte | Final Cell Voltage (V) | Comments |
|---|---|---|---|---|---|---|---|---|---|
| Performance Optimization Experiments (small anolyte volume, vary anolyte concentration) ||||||||||
| 11 (14-11) | C: 0.1 M NaCl (4 L) CC: 0.1 M NaCl (4 L) A: 0.05 M Na2SO4 (0.5 L) | Nafion-324 | 6 | 265 | 3.7 | 32 | C: 11.2 CC: 1.8 A: 1.5 | 4.2 | A: 100 mL/min CC: 200 mL/min |
| 12 (15-12) | C: 0.1 M NaCl (4 L) CC: 0.1 M NaCl (4 L) A: 0.05 M Na2SO4 (0.5 L) | Nafion-324 | 2 | 156 | 6.5 | 57 | C: 11.0 CC: 2.3 A: 1.8 | 4.3 | Cathode fell apart |
| 13 (16-13) | C: 0.1 M NaCl (4 L) CC: 0.1 M NaCl (4 L) A: 0.005 M Na2SO4 (0.5 L) | Nafion-324 3000k dry | 1.75 | 99 | 5.4 | 42 | C: 10.9 CC: 2.3 A: 2.4 | 4.8 | A: 100 mL/min CC: 200 mL/min Spacer plate added to cathode chamber, used from this point on to reduce the chamber volume From here on cathode = 42 cm2 (5 cm × 8.2 cm) |
| 14 (17-14) | C: 0.1 M NaCl (4 L) CC: 0.1 M NaCl (4 L) A: 0.005 M Na2SO4 (0.5 L) | Nafion-324 3000k dry | 5.3 | 194 | 3.5 | 27 | C: 11.0 CC: 1.9 A: 2.2 | 4.4 | A: 100 mL/min CC: 200 mL/min |
| 15 (18-15) | C: 0.1 M NaCl (4 L) CC: 0.1 M NaCl 4 L) A: 0.0005 M Na2SO4 (0.5 L) | Nafion-324 3000k dry | 6 | 309 | 4.9 | 38 | C: 11.0 CC: 1.8 A: 3.1 | 5.5 | A: 100 mL/min CC: 200 mL/min |
| 16 (18-16) | C: 0.1 M NaCl (4 L) CC: 0.1 M NaCl (4 L) A: 0.0005 M Na2SO4 (0.5 L) | Nafion-324 3000k dry | 3 | 155 | 4.9 | 38 | C: 10.9 CC: 2.1 A: 3.1 | 5.5 | A: 100 mL/min CC: 200 mL/min |
| Performance Optimization Experiments (vary catholyte concentration) ||||||||||
| 17 (19-17) | C: 0.1 M NaCl (4 L) CC: 0.01 M NaCl (4 L) A: 0.005 M Na2SO4 (0.5 L) | Nafion-324 3000k dry | 3 | 182 | 5.8 | 45 | C: 10.5 CC: 2.6 A: 3.2 | 6.2 | A: 100 mL/min CC: 200 mL/min |
| 18 (20-18) | C: 0.01 M NaCl (4 L) CC: 0.01 M NaCl (4 L) A: 0.005 M Na2SO4 (0.5 L) | Nafion-324 3000k dry | 6 | 178 | 2.8 | 22 | C: 10.7 CC: 2.3 A: 5.4 (not mixed) | 9.4 | A: 0 mL/min CC: 200 mL/min Anolyte stagnant throughout experiment |
| 19 (21-19) | C: 0.01 M NaCl (4 L) CC: 0.01 M NaCl (4 L) A: 0.005 M Na2SO4 (0.5 L) | Nafion-324 3000k dry | 6 | 187 | 3.0 | 23 | C: 10.1 CC: 2.4 A: 2.2 | 8.3 | A: 0 mL/min CC: 200 mL/min Central chamber stagnant in second half of experiment |
| 20 (22-20) | C: 0.001 M NaCl (4 L) CC: 0.01 M NaCl (4 L) A: 0.005 M Na2SO4 (0.5 L) | Nafion-324 3000k dry | 6 | 146 | 2.3 | 18 | C: 10.2 CC: 2.3 A: 2.3 | 10.9 | A: 100 mL/min CC: 200 mL/min Anolyte stagnant second hour |

TABLE 1-continued

Summary of Electrolytic Cell Performance Trials
Micro-Flow Cell Experiments

| | Experimental Conditions | | | | Results | | | |
|---|---|---|---|---|---|---|---|---|
| Trial # page-exp. | Electrolytes C: Catholyte CC: Central Chamber A: Anolyte (all at 860 mA, DSA anode, centralchamber flow 100 mL/min., unlessnoted) | PEM and Cathode (bold = new) | Run Time (hr) | Final H2O2 Conc. (ppm) | Avg. H2O2 Rate (mg/h cm2) | Ave. Faradaic Efficiency (%) | Final pH C: Catholyte CC: Central Chamber A: Anolyte | Final Cell Voltage (V) | Comments |

Performance Optimization Experiments (low anolyte and catholyte concentrations)

| 21 (23-21) | C: 0.01 M NaCl (4 L) CC: 0.1 M NaCl (4 L) A: 0.005 M Na2SO4 (0.5 L) | Nafion-324 3000k dry | 6 | 275 | 4.4 | 34 | C: 11 CC: 1.9 A: 2.3 | 6.6 | A: 100 mL/min CC: 200 mL/min |
| 22 (24-22) | C: 0.01 M NaCl (4 L) CC: 0.1 M NaCl (4 L) A: 0.005 M Na2SO4 (0.5 L) | Nafion-324 3000k dry | 3 | 194 | 6.2 | 48 | C: 11 CC: 2.1 A: 2.3 | 6.6 | A: 100 mL/min CC: 200 mL/min |
| 23 (59-23) | C: 0.01 M NaCl (4 L) CC: 0.1 M NaCl (4 L) A: 0.005 M Na2SO4 (0.5 L) | Nafion-324 3000k dry | 3 | 185 | 5.1 | 46 | C: 11.1 CC: 2.1 A: 2.2 | 7.27 | A: 100 mL/min CC: 200 mL/min Cell production checked after 34 days dormant (assembled) |

Performance Optimization Experiments (stagnant anolyte)

| 24 (60-24) | C: 0.01 M NaCl (4 L) CC: 0.1 M NaCl (4 L) A: 0.005 M Na2SO4 (0.5 L) | Nafion-324 3000k dry | 6 | 442 | 6.1 | 54 | C: 11.2 CC: 1.8 A: 3.5 (not mixed) | 5.91 | A: stagnant CC: 200 mL/min |

Performance Optimization Experiments (vary conc. of sodium citrate in central, almost stagnant anolyte)

| 25 (61-25) | C: 0.01 M NaCl (4 L) CC: 0.1 M C6H5Na3O7 (4 L) A: 0.05 M Na2SO4 (0.5 L) | Nafion-324 3000k dry | 6 | 529 | 7.3 | 65 | C: 11.3 CC: 3.4 A: 1.5 | 5.28 | A: v low flow CC: 200 mL/min |
| 26 (61-26) | C: 0.01 M NaCl (4 L) CC: 0.01 M C6H5Na3O7 (4 L) A: 0.05 M Na2SO4 (0.5 L) | Nafion-324 3000k dry | 5:20 | 326 | 5.1 | 40 | C: 11.3 CC: 5 A: 1.5 | 6.6 | A: v low flow CC: 200 mL/min |
| 27 (61-26) | C: 0.01 M NaCl (4 L) CC: 0.01 M C6H5Na3O7 (2 L) A: 0.05 M Na2SO4 (0.5 L) | Nafion-324 3000k dry | 6 | 415 | 5.8 | 51 | C: 11.2 CC: 3.7 A: 1.5 | 6.64 | A: v low flow CC: 200 mL/min |

2. Micro-Flow Cell Baseline Performance

The micro-flow electrolytic cell was initially set up in the three chamber configuration as a reference point for performance and to ensure the system was functioning properly. The primary challenge in this technology is achieving high hydrogen peroxide production rates with high Faradaic efficiencies (>60%). The pH shifts of the anolyte, catholyte, and central chamber were very rapid and changed very slowly after about 1 hour. This was very consistent behavior that was independent of hydrogen peroxide production.

Initially, volumes of solutions were 4 L anolyte and catholyte and 0.5 L for the central chamber. The current density of the cathode was approximately 18 mA/cm2 (based on geometric cathode area of cell). Hydrogen peroxide production was at a suitable level, 7 mg/hcm$^2$ and 62% Faradaic efficiency, in Trial TR2 (Table 1) using 0.1 M NaCl concentration in the catholyte and central chamber reservoirs and 0.1 M Na2SO4 in the anolyte reservoir.

The initial trials of the three chamber configuration, Trials 8-10, showed lower $H_2O_2$ production rates that appeared to decrease with decreasing anolyte concentration. The final pH value of the catholyte appeared to decrease while the anolyte pH increased with very low anolyte concentrations (Trial 10). The Faradaic efficiency (for $H_2O_2$ production) also had a downward trend with decreasing anolyte concentration. The effects of concentrations, reservoir volumes, flow rates, and the use of sodium citrate were investigated in the remaining experiments with the micro-flow cell (Trials 11-27 of Table 1) described in the next section.

3. Micro-Flow Electrolytic Cell Performance Evaluation

The micro-flow electrolytic cell performance was evaluated using different electrolyte concentrations and flow rates.

Data was collected by the data acquisition system automatically for pH and temperature, cell voltage, and air flow while hydrogen peroxide concentrations were determined manually by titration as described above. The data reported was of the reservoir pHs at the time of hydrogen peroxide concentration measurement.

Figure 6:
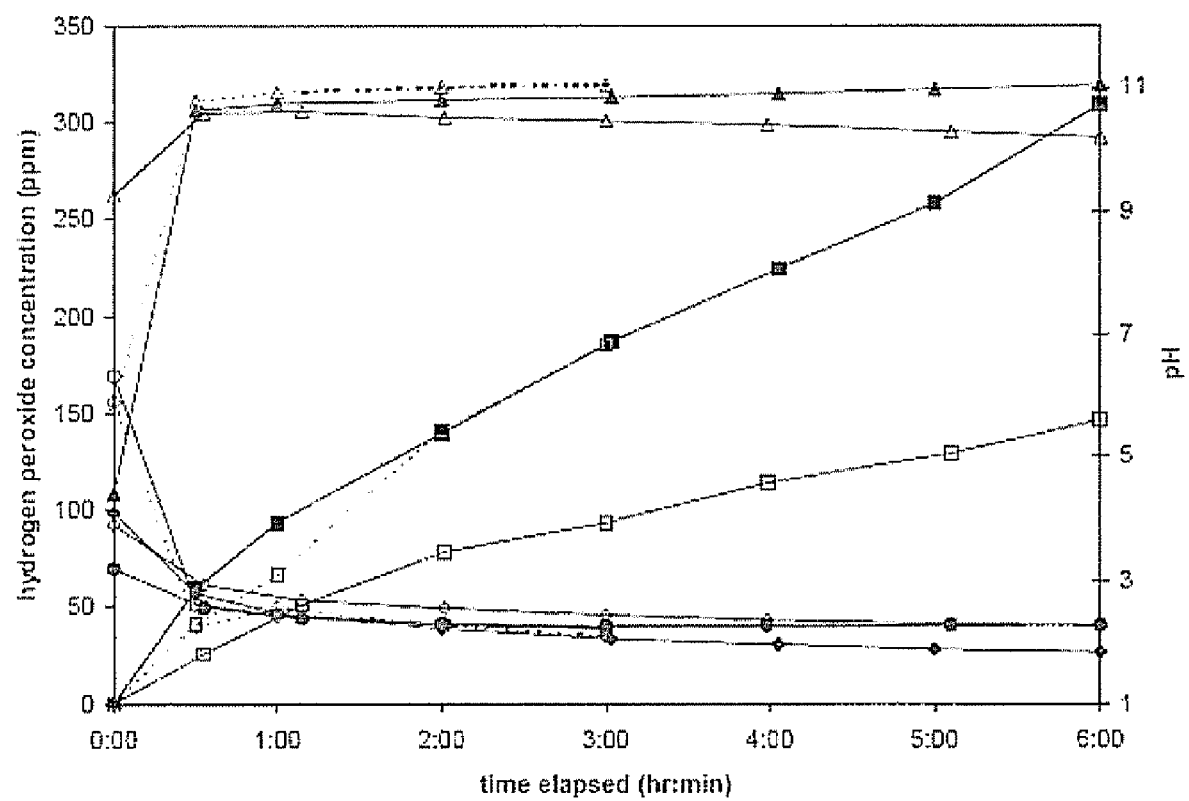
FIG. 6 illustrates electrolytic micro flow cell trials 15 (solid symbols, solid lines), 20 (open symbols, solid lines), and 23 (open symbols, dashed lines). Hydrogen peroxide concentration (squares), catholyte pH (triangles), central chamber pH (diamonds), and anolyte pH (circles). See Table 1 for electrolyte concentrations.

An illustrative plot of pH and peroxide data for three separate trials with three different electrolyte concentration combinations is shown in FIG. 6. The three trials (15, 20, and 23 from Table 1) were designated by closed symbols with solid lines, open symbols with solid lines, and open symbols with dotted lines, respectively. The $H_2O_2$ concentration is designated by squares, catholyte pH is triangles, central chamber pH is diamonds, and anolyte pH is circles. Trial 15 used 0.1 M NaCl in the catholyte and central chamber (4 L total volume for each) and 0.0005 M $Na_2SO_4$ in the anolyte (0.5 L total volume). Trial 20 used 0.001 M NaCl in the catholyte, 0.01 M NaCl in the central chamber, and 0.005 M $Na_2SO_4$ in the anolyte, all other parameters the same. Trial 23 used 0.01 M NaCl in the catholyte, 0.1 M NaCl in the central chamber, and 0.005 M $Na_2SO_4$ in the anolyte, all other parameters the same.

The data in FIG. 6 illustrates the most apparent trends that were observed during the performance evaluation experiments. The most significant trend was that the $H_2O_2$ production rate was reduced at very low catholyte electrolyte (NaCl) concentration (Trial 20). The next most significant trend illustrated was that low central chamber electrolyte concentrations reduced the achievable catholyte pH. In the extreme case of Trial 20 the catholyte pH gradually decreased over time after the initial pH shift. At higher catholyte concentrations it was found that a concentration gradient between the central chamber (higher conc.) and catholyte (lower conc.) helped to increase the catholyte pH as in the case of Trial 23. It was also found that very low electrolyte concentrations in the catholyte (Trial 20) result in higher central chamber pH values.

Upon completion of an experiment the acidic anolyte and central chamber solutions and basic catholyte solution were combined to neutralize one another for discharge. The pH was balanced within the range of 6-8 (nominally a pH of 7) due to the electrolytic process being zero-sum in proton production or consumption overall.

The effects of pumping rates were determined in other trials. Effective cell performance was maintained when the anolyte pumping rate was decreased to zero (static) or very low (~25 mL/min) flow, see Trials 24-27. There were no significant effects on pH shifts when the central chamber was not circulated in the micro-flow cell, see Trial 19. (The $H_2O_2$ production was reduced, however, in the 2x cell when the central chamber was not circulated.)

The use of sodium citrate as the central chamber electrolyte was investigated to determine its effect on pH shifts, proton buffering and transport, and hydrogen peroxide production. The production of citric acid as a cleaning solution was desired due to its pH buffering power in the appropriate range and its proven performance in commercial cleansers. The buffering was desirable for cleaning power due to the "reservoir" of available acid protons the citric acid provides as protons are consumed during the cleaning process. As a result of the citrate ion's buffering the pH shift of the central chamber containing sodium citrate occurred at a slower rate and this aspect is discussed in more detail in the 2x cell performance evaluation below. Therefore the appropriate concentration of sodium citrate in the central chamber must be determined in order to achieve the desired pH.

Three initial trials were made with the micro-flow cell (Trials 25-27) as a starting point for operating conditions and performance. Good to moderate $H_2O_2$ production and Faradaic efficiencies were maintained at 0.1 M sodium citrate in 4 L and 0.01 M sodium citrate in 2 L. The pH shifts of the anolyte and catholyte were consistent. The pH shift of the central chamber was slower as expected (further optimization for pH shifts was made in the 2x cell experiments described below). The 2 L central chamber volume was employed because the volume of caustic cleanser (catholyte) consumed in a filter cleaning cycle is twice that of the acid solution volume. This change in central chamber volume does not appear to affect the overall cell performance and reduces the number of protons needed to convert the sodium citrate to citric acid by a factor of two.

The overall conclusion of the micro-flow cell experiments is that the catholyte and central chamber concentrations should be kept at moderate levels, at least 0.01 M cation concentrations for good $H_2O_2$ production and pH shifts. A concentration gradient between the central chamber and catholyte is also beneficial to pH shifts. Flow rates and turbulence of catholyte solution over the carbon cloth cathode need to be kept as high as possible to keep parasitic $H_2O_2$ decomposition reactions to a minimum and maintain good Faradaic efficiencies (many experiments that had low Faradaic efficiencies were observed to have pockets of "dead" flow within or channeled flow around the carbon cloth cathode). Flow rates of the central chamber and anolyte need only be great enough to keep the solutions mixed and therefore much lower flow rates (and pumping costs) are sufficient. Polyprotic anions such as citrate are compatible with the system and are not degradative to cell performance.

4. 2x Electrolytic Cell Performance Evaluation

The 2x electrolytic cell performance was evaluated using different electrolyte concentrations based on the results obtained for the micro-flow cell above. The conditions necessary to produce the desired solution concentrations and volumes for membrane cleansing were partially optimized and tested for reproducibility. Data was collected by the data acquisition system automatically for pH and temperature, cell voltage, and air flow while hydrogen peroxide concentrations were determined manually by titration as described above. The data reported here is of the reservoir pHs at the time of hydrogen peroxide concentration measurement.

Figure 7:
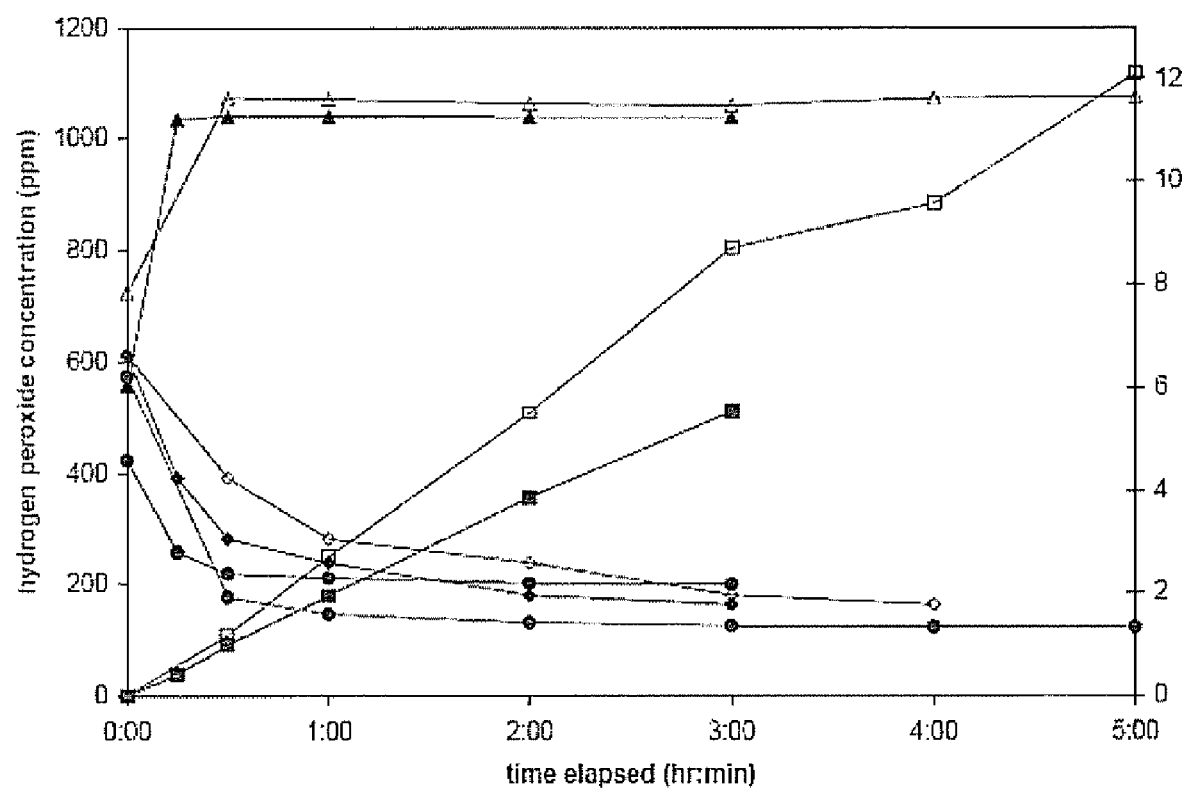
FIG. 7 illustrates 2x electrolytic cell trials 2x-1 (solid symbols) and 2x-3 (open symbols). Hydrogen peroxide concentration (squares), catholyte pH (triangles), central chamber pH (diamonds), and anolyte pH (circles). Electrolyte concentrations are listed in Table 1.

The initial comparison between the 2x cell mid the micro-flow cell were made using conditions similar to those for the micro-flow cell. An illustrative plot of pH and peroxide data for two separate trials with two different electrolyte ($Na_2SO_4$) concentrations for the anolyte is shown in FIG. 7. Sodium chloride is the electrolyte for both the central and catholyte chambers. The two trials (2x-1 and 2x-3 from Table 1) are designated by closed symbols and open symbols, respectively.

The $H_2O_2$ concentration is designated by squares, catholyte pH is triangles, central chamber pH is diamonds, and anolyte pH is circles. Trial 2x-1 used 0.005 M Na2SO4 in the anolyte while Trial 2x-3 used 0.05 M Na2SO4 in the anolyte (both 0.5 L total volume). Both trials used 0.01 M NaCl in the catholyte and 0.1 M NaCl in the central chamber and the same current density (17.4 mA/cm2 per layer of carbon cloth) and reservoir volumes as the micro-flow cell.

Trial 2x-1 (FIG. 7, closed symbols) demonstrates the ability to scale-up the geometric size of the electrolytic cell to increase the rate of peroxide production. This experiment used a single layer of carbon cloth cathode and current density that is directly comparable to the micro-flow cell. The average rate of hydrogen peroxide production for the 2x cell in this experiment (170 ppm/h) is approximately three times that of the micro-flow cell (e.g., Trials 15 and 23 in FIG. 6) and acceptable Faradaic efficiency.

Trial 2x-3 (FIG. 7, open symbols) demonstrated the ability to increase the output of an electrolytic cell of a given geometric size by increasing the amount of cathode material. This experiment used two layers of carbon cloth cathode and current density that were directly comparable to Trial 2x-1 with the single layer carbon cloth. The average rate of hydrogen peroxide production for the 2x cell in this experiment (223 ppm/h) was approximately 1.3 times that of the 2x cell with a single layer of carbon cloth cathode. The Faradaic efficiency is only 41% in this experiment. This is due to a slower velocity of the catholyte across areas of the more dense double layer of carbon cloth cathode. There were "dead" spots with little or no flow in regions of the cloth that have tangled and bunched up against the cathode chamber wall, especially near the cell chamber inlet. This effect was observed in other experiments throughout the project. (It should be noted that the Faradaic efficiency for the first hour of Trial 2x-2 was much greater at lower current density, 74%, and dropped to 33% at the higher current density during the second hour. A similar current density effect was observed later in Trial 2x-4.

Overall it was observed in Trials 2x-1 and 2x-3 (FIG. 7) that the pH shifts were affected by the anolyte concentration. The lower anolyte concentration in Trial 2x-1 (0.005 M $Na_2SO_4$) reduced the pH that the catholyte reached during the experiment compared to Trial 2x-3 (0.05 M $Na_2SO_4$) by about 0.3 pH units. The lower anolyte concentration also resulted in higher anolyte pH and a slower rate of pH shift in the central chamber.

Sodium citrate was employed in Trials 2x-4 through 2x-8 to determine the appropriate concentration of citrate in the central chamber, to produce cleanser solutions to test directly on whey-fouled membranes, determine the reproducibility of cell performance, and provide a basis set of conditions for further optimization and scale-up.

Figure 8:
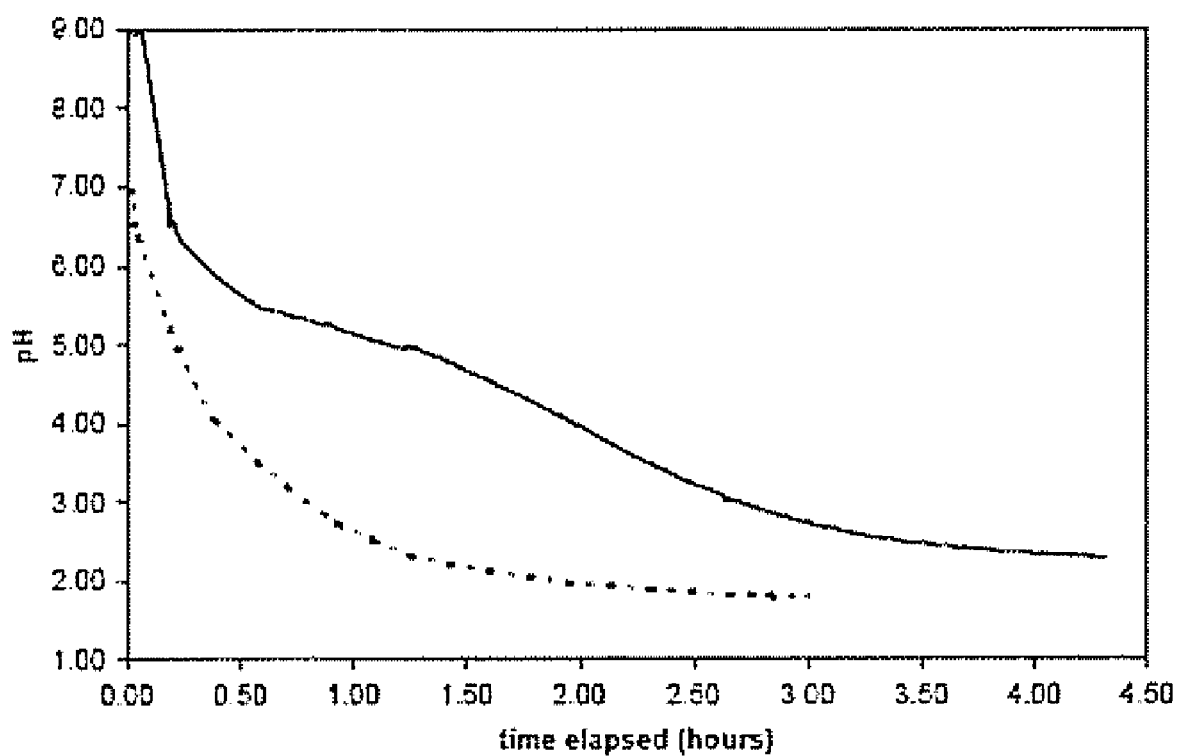
FIG. 8 illustrates central chamber pH shifts for 2x electrolytic cell trials 2x-1 with sodium chloride (dashed line) and 2x-7 with sodium citrate (solid line)

The plot in FIG. 8 illustrates the shift in pH of a 0.05 M sodium citrate solution over time as the protons produced at the anode effectively titrate the sodium citrate for Trial 2x-7 (solid line). This is compared to the pH shift for titration of NaCl as the central chamber electrolyte in Trial 2x-1 (dashed line). These data sets were collected in real time with the data acquisition/switch unit and the pH recorded by computer every 5 seconds. One single curve is expected for NaCl as it is protonated to HCl because it is a strong acid without buffering capacity. Three steps in the titration curve of sodium citrate are expected near pH 6.39, 4.77, and 3.14. A change in slope of pH vs time is clear near a pH of 6.4, but is smeared out over the other two buffered end points. The important feature is the time it takes to reach a pH of ~2.5 to be in the desirable acidic pH range.

Figure 9:
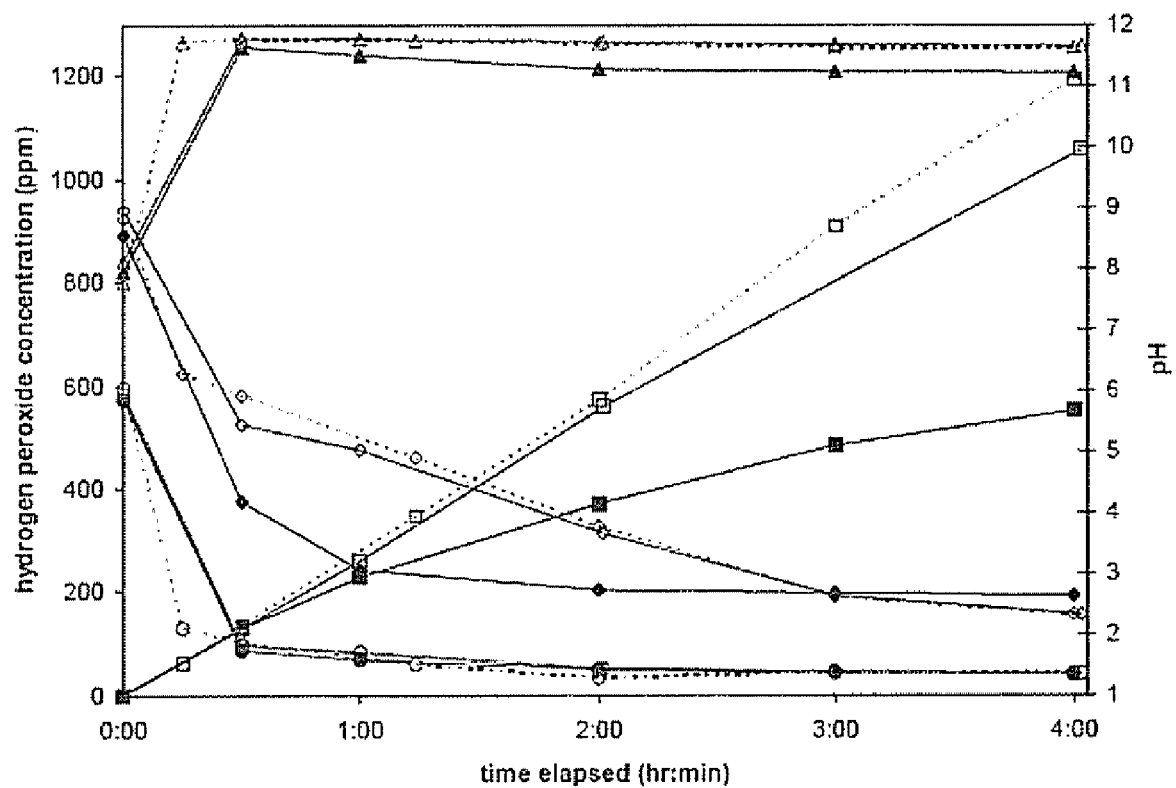
FIG. 9 illustrates 2x electrolytic cell Trials 2x-4 (solid symbols, solid lines), 2x-7 (open symbols, solid lines), and 2x-8 (open symbols, dashed lines). Hydrogen peroxide concentration (squares), catholyte pH (triangles), central chamber pH (diamonds), and anolyte pH (circles). Electrolyte concentrations are listed in Table 1.

Data from Trials 2x-4, -7, and -8 are presented in FIG. 9 (refer to Table 1) to demonstrate the effects of sodium citrate concentration in the central chamber and reproducibility of cell performance. Trial 2x-4 used 0.01 M sodium citrate in the central chamber while Trials 2x-7 and 2x-8 had 0.05 M sodium citrate in the central chamber. All other parameters were kept equal. The current was limited for the first hour in Trial 2x-4 due to the cell resistance (at lower electrolyte strength) creating a voltage drop greater than the upper limit of the power supply (30 V).

The lower sodium citrate concentration (0.01 M) in Trial 2x-4 (FIG. 9, solid symbols, solid lines) limits the hydrogen peroxide production to approximately half that achieved with five times the sodium citrate concentration. The central chamber pH drops rapidly, but the pH does not shift below 2.6. The catholyte pH increases rapidly initially, but then gradually decreases over time. Both of these results are consistent with Trial 20 (FIG. 6, open symbols, solid lines) and the trends observed for the micro-flow cell experiments. These trends showed that the catholyte and central chamber concentrations should be kept at moderate levels, at least 0.01 M cation concentrations for good $H_2O_2$ production and pH shifts, and a concentration gradient between the central chamber and catholyte is also beneficial to pH shifts. It is apparent that the sodium citrate concentration and concentration gradient necessary for suitable cell performance are greater than for NaCl.

The higher sodium citrate concentration in Trial 2x-7 (open symbols, solid lines) and Trial 2x-8 (open symbols, dashed lines) resulted in good hydrogen peroxide production and the desired pH shifts in the catholyte and central chambers (FIG. 9). Hydrogen peroxide concentrations were between 1000 and 1200 ppm, the catholyte pH was 11.6, and the central chamber pH was 2.3 after 4 hours. Trials 2x-5 and 2x-6 were also consistent with these results. Hydrogen peroxide production was nearly linear over the trial time. The central chamber pH decreased more slowly through its three buffering pH regions (discussed earlier), but did become fully protonated in approximately 3-3.5 hours.

Overall, effective conditions were determined with the use of sodium citrate as the central chamber reservoir to provide good pH shifts and more than adequate hydrogen peroxide production.

The pH shifts were very consistent between runs of the same conditions and hydrogen peroxide production was reliable.

The final set of 2x electrolytic cell performance experiments, Trials 2x-9 through 2x-13 (Table 1), were performed to determine the mechanical robustness of the electrolytic system with extended run times. Higher electrolyte concentrations (0.1 M NaCl and 0.05 M $Na_2SO_4$) were used in all three reservoirs to determine if there was a difference in pH shifts and peroxide production rates compared to the lower concentrations used throughout most of the previous experiments. Trials 2x-10 through 2x-13 were run overnight, unattended, but monitored by computer and leak detectors. The system proved to be mechanically stable and reliable. The pH shifts were greater than for previous experiments with the micro-flow cell under similar conditions (Trials 11 and 12 in Table 1) primarily due to the longer run time. The rates of pH shifts were similar to the micro-flow cell experiments. Very little hydrogen peroxide diffused through the PEM into the central chamber (1-2 ppm measured). The upper limit of hydrogen peroxide concentration in this system was limited to about 1500 ppm.

Hydrogen peroxide production occurred primarily over the first 6 to 7 hours of operation with nearly linear production rate, but reached a plateau above 1300 to 1500 ppm $H_2O_2$ concentration for the remainder of the experiments (Trials 2x-10 through 2x-12). The carbon cloth cathode was changed for a new one just prior to Trial 2x-10. This particular cathode appeared to be more densely matted than the previous cathode resulting in, visually, more slow-flow or "dead" areas over the carbon cloth and channeling of catholyte around the perimeter of the cathode. The carbon cloth was untangled and spread out more thoroughly in the chamber for Trial 2x-12 and this made some improvement. The current density relative to the catholyte flow velocity over the carbon cloth was suspected to have an influence on $H_2O_2$ production. Current density did appear to influence Faradaic efficiencies in Trials 2x-2 and 2x-4. This was not the case at the higher $H_2O_2$ concentration of Trial 2x-13 in which the cell current was cut in half after 7 hours (after reaching ~1000 ppm $H_2O_2$). Contamination of the system was ruled out since a contaminant would have caused a significant reduction in the $H_2O_2$ concentration. It is expected that a better defined and reproducible flow pattern that increases catholyte turbulence and velocity over the entire carbon cloth will allow this issue to be resolved.

EXAMPLE 3

Dairy Filter Cleaning Evaluation

The objective of this task was to evaluate the viability of cleaning filtration membranes used for dairy processing with cleansing solutions produced by the electrolytic cell. Cleaning performance of the electrolytic cell-produced cleansers is compared to the performance of a commercial cleanser product line designed for this application. Simulated cleanser solutions (that mimic potential electrolytic cell product solutions) are also evaluated for comparison. The primary challenge in this task was to determine cleanser solutions that the electrolytic technology can produce that perform equally as well as the commercial cleansers.

1. Experimental Setup

The primary component of the filtration apparatus used for evaluating membrane fouling and cleansing behavior was a miniature filtration membrane cell produced by Osmonics, Inc. (Sepa CF Membrane Cell) for testing and filtering with small RO/NF/UF membranes in a cross-flow configuration similar to the configuration of a spiral wound membrane element. A small filter membrane was sandwiched between the two halves of the cell along with a plastic mesh feed spacer and permeate carrier. The filtration cell was designed to operate up to 1000 psi for demanding reverse osmosis applications. A hydraulic hand pump (Enerpac P142) was attached to the filter cell holder that compresses the cell with a hydraulic piston. The filter cell holder was pressurized to, at least, the operating pressure of the filter cell. In this work the filtration cell was fed by a high pressure rotary vane pump up to 250 psi (Procon, Inc., 113A100F31AA250, 100 gph, food grade, stainless steel). The high pressure feed line was a Teflon-lined braided stainless steel hose with stainless couplings rated to 2500 psi (McMaster-Carr 4552K213, 5/16" ID). All other lines are polypropylene tubing. A 1/8" K-type thermocouple (Omega, Inconel or stainless steel sheathing) was mounted in the back side of the cell in the inlet feed port to monitor the feed solution temperature. A pressure gage was mounted on the feed solution outlet port and the pressure set by a flow-¼ restricting needle valve positioned after the pressure gage. The feed solution reservoir was a 5 quart, Teflon-lined, electric cooking pot for heating and maintaining the feed solutions at 55 C. The permeate flow rate, out of the top of the filter cell, was monitored with rotometers calibrated for water (Gilmont No. 12, 0-40 mL/min; No. 13, 0-300 mL/min). The filtered permeate was fed back into the feed solution to maintain a constant feed concentration.

The filtration membrane type tested in this program was an ultrafiltration membrane produced by Osmonics, Inc. for dairy filtration applications (polyethersulfone, type PT 1221932, molecular weight cutoff 5000 Daltons). The active filter membrane area was 24 in2 (0.0266 m2).

2. Membrane Fouling

Membrane fouling was done in a consistent manner that was to mimic the filtration conditions in a processing facility, yet accelerate the fouling process for more rapid testing. A feed temperature of 50-60 C was employed as this is typically used in dairy processing to prevent microbial growth, yet not damage the product. This was not warm enough for pasteurization. Therefore, much of the microbial content in the feed will remain viable until the membrane was cleansed. The foulant used in this program was food grade (Grade A) dried cheese whey (produced by Gausner, Inc., distributed by Walton Feed, Inc.). The microbial content according to the producer was very low at 10 bacteria (coliform) per gram of whey.

The solids loading in the feed solution was held constant at 10% wt/vol. This provided permeate flow rates that were in a convenient range for measurement. (In whey filtration processing the solids loading begins around 6% and was concentrated to 30-35% in commercial plants.) The filter feed pressure was held at a constant hydrostatic pressure of 100 psi to accelerate the densification of the protein gel layer that builds up and fouls the filtration membrane surface. Normal filtration pressures are around 40-60 psi to minimize gel layer densification and still provide good permeate fluxes 28

The mechanism of membrane fouling with solids follows a general two-step process. The first step was formation of a gel layer of the solids content at the membrane surface that was approximately 60% solids in this system (determined from analysis of data in FIG. 10). This gel layer forms almost immediately and limits the permeate flux through the membrane. This was illustrated in FIG. 10 that shows the effect of whey solids loading and feed pressure on permeate flux. At greater feed pressures the flux does not appreciably increase, but rather the gel layer thickness increases. In the Sepa membrane cell with a clean UF membrane described above the permeate flux of pure water was around 40-70 mL/min. When 10% whey solids was added to the feed water (at 100 psi) the flux immediately drops to about 15-25 mL/min (dependent on the particular membrane) and decreases rapidly to about 5-8 mL/min over the next 10 minutes. This fouling was reversible and was easily cleaned from the membrane surface with flushing.

The second step of membrane fouling was densification of the gel layer and compaction on the membrane surface. This occurs over several hours to weeks depending on the operating pressure and foulant. In general, the greater the feed pressure on the filter, the greater the extent of gel layer densification. Extreme densification of the gel layer at high pressures will lead to compaction of the solids that can be lodged in the pores of the filter. This leads to irreversible fouling that is difficult or impossible to remove from the membrane, even with cleansers and back flushing. Ideally the filter membrane system used in this program should be run at pressures of about 25-50 psi (according to FIG. 10) to avoid irreversible fouling. For the purposes of this program a feed pressure of 100 psi was used to accelerate the gel layer densification for accelerated fouling in a few hours. This was effective for making comparisons between cleanser solutions. The membrane fouling procedure used in this program is described below.

The filter was checked to make sure that the correct filter was in the SEPA cell. An ultra-filtration membrane, if needed, was placed in the SEPA cell, shiny side face down. The membrane cell holder was pressurized with the hydraulic pump to at least 200 psi. While heating, 4 liters of de-ionized water were circulated through the SEPA cell until the temperature of the fluid in the cell reached 55° C. The de-ionized water permeate flow rate was then recorded at 55 C and 100 psi. The pump was turned off.

400 grams of dry whey was added to the 4 liters of de-ionized water. The 10% whey solution was circulated through the SEPA cell at 100 psi., maintaining the temperature at 55 C. The permeate flow rate was recorded every minute or every 2 minutes according to how fast it is decreasing up to 15 minutes or until the rate of decrease slows. Then, the flow rate was recorded every 10 minutes up to 45 minutes or an hour and then once an hour to 3.5 hours. The pump was then turned off and the system drained.

This was the general procedure for preparing a membrane for evaluation of cleaning solutions. Data for the extent of membrane fouling is shown in the section below that presents the results of membrane cleansing. One example is illustrated in the next section (FIG. 11) that shows permeate flux readings for three fouling/cleaning cycles for one membrane. The permeate flux of fouled membranes reaches a nearly constant value after ~1 hour and is consistently in the range of 3-5 mL/min after 3.5 hours (denoted as "whey(f)"). This demonstrates that the extent of fouling is consistent from one experiment to the next.

3. Membrane Cleaning

The cleansers used for comparative cleaning performance evaluations included a commercial product line produced by Alconox specifically for membrane filtration systems used in dairy and food processing. The performance of these cleansers was used as a standard for comparing the performance of cleanser solutions that can be produced by the electrolytic cell being developed in this program. It was found that cleanser solutions produced by the 2x electrolytic cell described earlier were equally effective at cleaning membranes fouled with cheese whey as described above.

The Alconox products used here were Alcojet powdered caustic detergent (1% solution, 20 g in 2 L of de-ionized water, pH ~11) and Citronox liquid acidic detergent (1% solution, 40 mL in 2 L of de-ionized water, pH ~2.7). Alcojet is sodium hydroxide and surfactant based while Citronox is citric acid and surfactant based.

The 2x electrolytic cell product solutions used for cleansing were the catholyte product (sodium hydroxide based and ~1100 ppm hydrogen peroxide, ph ~11.6) and central chamber product (citric acid based, ph ~2.3). Solutions from electrolytic cell Trials 2x-6 through 2x-8 (Table 1) were specifically used for this evaluation.

Simulated cleaning solutions were prepared from concentrated chemical sources that simulate electrolytic cell product solutions. This was done so that several solution concentrations could be tested in an accelerated manner within the time period of the program. An example of simulated cleaning solution composition is 0.005 Molar NaOH with 500 ppm $H_2O_2$ in de-ionized water (caustic cleanser, pH ~115) and 0.1 Molar citric acid monohydrate in de-ionized (acidic cleanser, pH ~2). Effects of changes in solution concentrations and the effect of hydrogen peroxide on membrane cleaning performance was evaluated.

The membrane cleaning procedure follows a protocol adapted from commercial procedures. 2 liters of each appropriate (commercial product or simulated) acid and base solutions were made up. The pH of each solution and $H_2O_2$ concentration were recorded if using simulated or electrolytic cell product base solutions. 4 liters of de-ionized water were heated to 55° C. The SEPA cell was flushed with heated de-ionized water for 10 minutes. Initial and final permeate flow rates were recorded and the system was drained. The base solution was heated to 55° C., then flushed through SEPA cell for 30 minutes. Initial and final permeate flow rates were recorded and the system was drained. 4 liters of de-ionized water were heated to 55° C. and flushed through the cell for 5 minutes. Initial and final permeate flow rates were recorded and the system was drained. If using simulated or electrolytic cell product base solution, the final $H_2O_2$ concentration of the base solution was recorded. The aforementioned steps were repeated for the acid solution.

2 liters of appropriate (commercial, simulated, or electrolytic cell product) base solution were prepared. The base solution was heated to 55° C. The SEPA cell was flushed with heated base solution for 10 minutes. The system was drained. 2 liters of de-ionized water was heated to 55° C. The cell was flushed with heated water for 5 minutes. The system was then drained and was flushed twice more with heated water at 55° C.

One dairy processing facility (Prodient, Inc., Juda, WI) follows a similar procedure to clean their 170 gpm UF plant (filter plant produced by Niro, Inc.), which primarily encounters protein fouling. This filter plant system used 8-10, 6" diameter spiral wound filter cartridges. This is the standard commercial filter plant for sanitary food, dairy, and medical processing manufactured by Niro and there are approximately 800 of these distributed world wide. After caustic cleansing at pH 12 and acid cleansing at pH 2 the system is disinfected with 500 ppm $H_2O_2$ for 10 min. The 500 ppm $H_2O_2$ concentration was used as a basis for the amount of peroxide in the simulated cleanser solutions tested in this program.

Disinfecting performance was evaluated on membranes that were treated with multiple fouling/cleaning cycles by using epifluorescent microscopy. Epifluorescent microscopy allowed for the direct observation and total count of viable and non-viable organisms on a membrane surface within 30 min, compared to traditional culturing methods that require 24-72 hours. It was found that initial disinfection evaluations could not be carried out using this technique without inoculating the filter system with high bacterial counts. This was due to the very low bacterial counts in the cheese whey (about 10 organisms per gram) and the very warm operating temperature used to prevent bacterial growth. With the very low bacterial count it would have been very difficult to find any viable or non-viable organisms on the large membrane surface (low bacterial density) at magnifications required to observe single cell colonies (400×-600× magnification).

4. Membrane Cleaning Performance Results

The membrane fouling/cleaning experiments carried out in this program are summarized in Table 2. The table is organized first in order of membrane number, second in order of experiment number (fouling/cleaning cycle) and third, the cleanser solution composition. The measured solution pHs are noted with the compositions. The hydrogen peroxide concentration was nominally 500 ppm to 40 ppm (measured), except for the electrolytic cell solutions where the measured concentrations are listed individually.

TABLE 2

Membrane Fouling/Cleaning Evaluation Experiments

| Membrane # | Experiment | Cleaning Solutions | Cleaning Solution Composition |
|---|---|---|---|
| 1 | 1 | Commercial | 1% Alcojet (pH 11.4), 1% Citronox (pH 2.8) |
|  | 2 | Commercial | 1% Alcojet (pH 11.4), 1% Citronox (pH 2.8) |
|  | 3 | Simulated | 0.005 M NaOH/500 ppm H2O2 (pH 11.1), 0.1 M citric acid (pH 2.1) |
| 2 | 4 | Commercial |  |
|  | 5 | Commercial | 1% Alcojet (pH 11.4), 1% Citronox (pH 2.8) |
|  | 6 | Commercial |  |
| 3 | 7 | Simulated |  |
|  | 8 | Simulated | 0.005 M NaOH/500 ppm H2O2 (pH 11.2), 0.1 M citric acid (pH 2.1) |
|  | 9 | Simulated |  |
| 4 | 10 | Simulated, no H2O2 |  |
|  | 11 | Simulated, no H2O2 | 0.005 M NaOH (pH 11.2), 0.1 M citric acid (pH 1.9) |
|  | 12 | Simulated, no H2O2 |  |
| 5 | 13 | Simulated |  |
|  | 14 | Simulated | 0.0075 M NaOH/500 ppm H2O2 (pH 11.5), 0.05 M citric acid (pH 2.3) |
|  | 15 | Simulated |  |
| 6 | 16 | Ecell Trial 2x-6 | Catholyte (1034 ppm H202/pH 11.6), Central chamber (pH 2.9) |
|  | 17 | Ecell Trial 2x-7 | Catholyte (1056 ppm H202/pH 11.6), Central chamber (pH 2.3) |
|  | 18 | Ecell Trial 2x-8 | Catholyte (1193 ppm H202/pH 11.6), Central chamber (pH 2.3) |
| 7 | 19 | Commercial | 1% Alcojet (pH 11.4), 1% Citronox (pH 2.8) |
|  | 20 | Commercial |  |
| 8 | 21 | Simulated |  |
|  | 22 | Simulated | 0.01 M NaOH/500 ppm H2O2 (pH 11.7), 0.05 M citric acid (pH 2.2) |
|  | 23 | Simulated |  |

Figure 11:
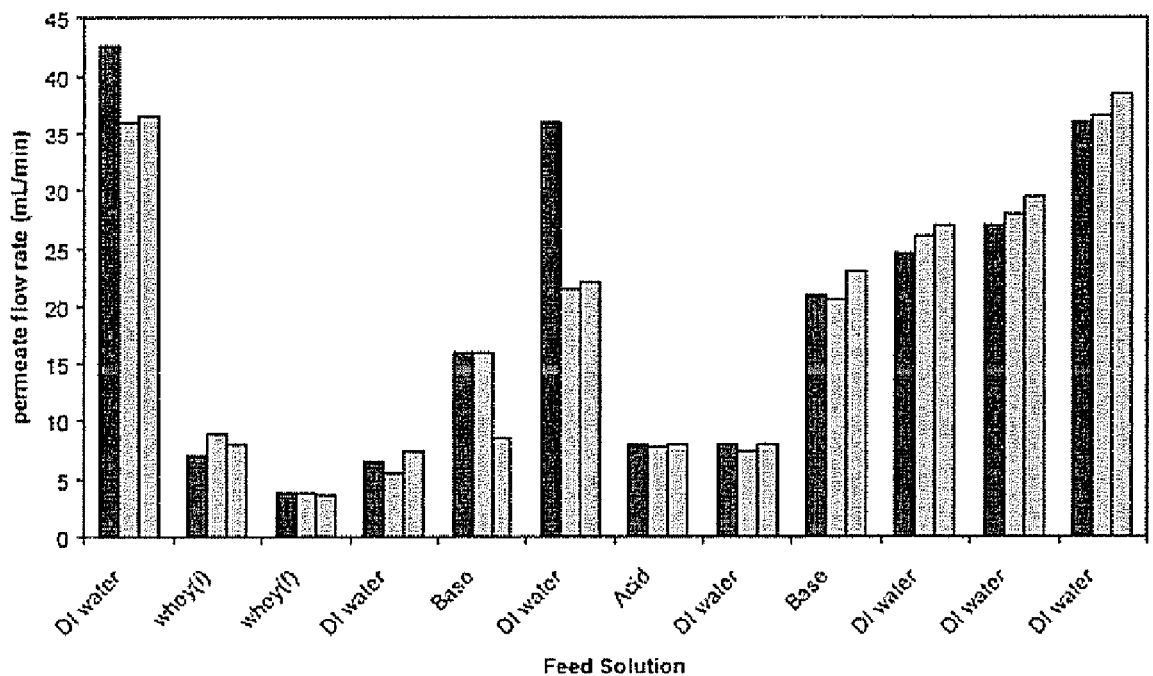
FIG. 11 illustrates permeate flux for three fouling/cleaning cycles of membrane #6 in Table 2.
Figure 12:
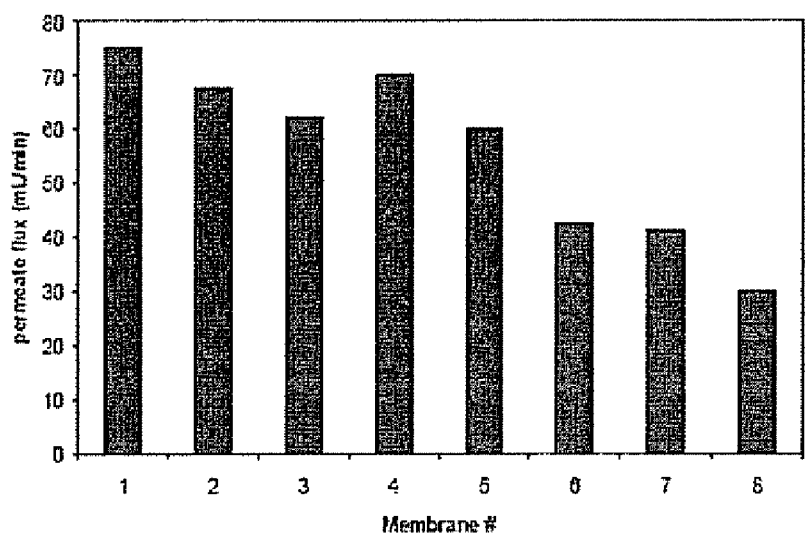
FIG. 12 illustrates permeate flux of pure water for membranes in the initial "virgin" state used for testing.

A single fouling/cleaning experiment (membrane #6 from Table 2, 2x electrolytic cell products) is illustrated in FIG. 11. Permeate fluxes for the three individual fouling/cleaning cycles declined in flux during fouling and recovery of flux during the different cleansing stages. The starting point of each experiment was the permeate flux of the "virgin" membrane. This flux value varied significantly from one membrane to the next and was likely due to differences in pore density. FIG. 12 shows the initial flux (in mL/min) of pure water through each of the membranes tested prior to any treatment. As a consequence of this variability in membrane flux behavior, the data of these experiments was normalized in order to compare one membrane to the next. All flux measurements were normalized to the initial pure water flux value measured for each membrane in the "virgin" state (% of initial flux).

Figure 13:
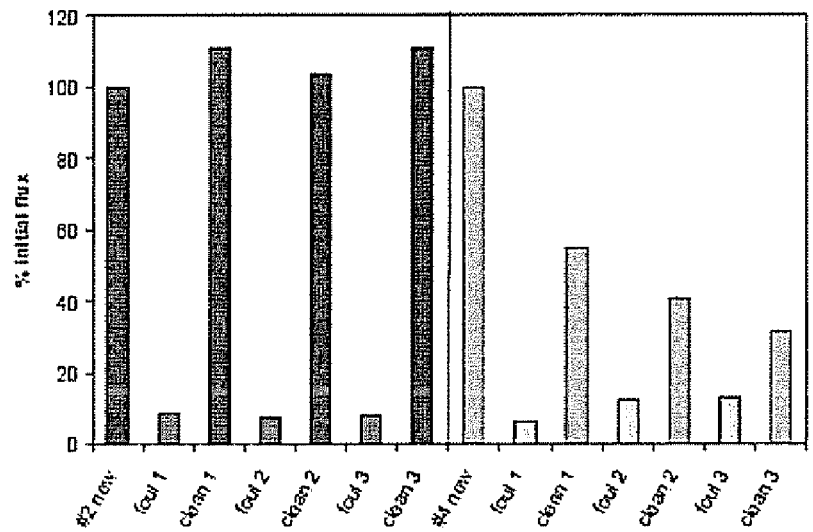
FIG. 13 illustrates normalized permeate flux of membranes #2 (left side) and #4 (right side) after each fouling and cleaning.

The normalization of flux data allowed the direct comparison of fouling and cleaning effectiveness between membranes. This was important to the performance evaluation because a new membrane was tested for each cleaning solution condition to avoid history effects of the previous experiment. FIG. 13 illustrates the flux behavior of effective and ineffective membrane cleaning. When membrane cleaning was effective (as for membrane #2) the pure water flux of the cleaned membrane did not decrease with each fouling/cleaning cycle (three cycles for each experiment). When cleaning was ineffective (as for membrane #4) the pure water flux of the cleaned membrane consistently decreased from one fouling/cleaning cycle to the next. The extent of fouling in all of these experiments was nearly identical based on the normalized flux measurements.

Figure 14:
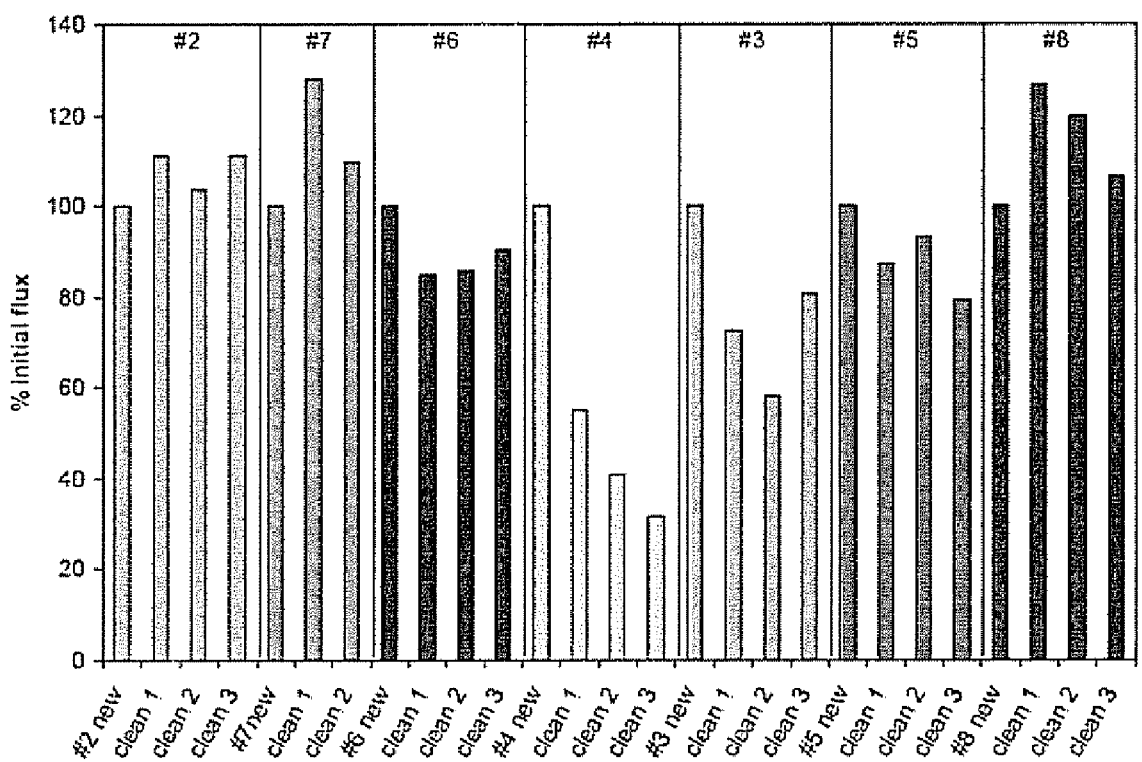
FIG. 14 illustrates flux recovery of fouled and cleaned UF membranes using different cleaning solutions listed in Table 2.

The overall effectiveness of tested cleaning solutions on membrane cleaning is summarized in FIG. 14. This performance data is presented in the same manner as FIG. 13, but without the fouled membrane flux data. Each group of flux data is for the membrane in the "virgin" state and after each fouling/cleaning cycle. The flux of the first two and last data sets appeared to increase to greater values than the "virgin" membrane.

Figure 10:
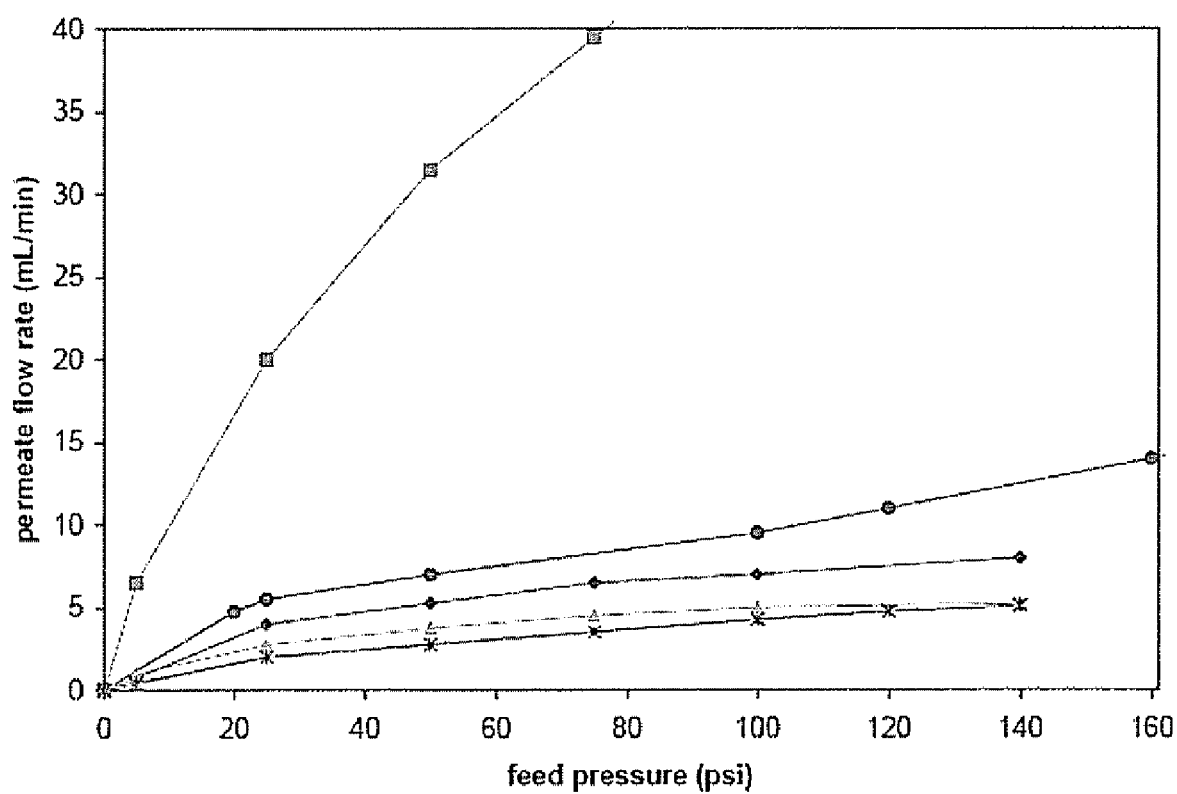
FIG. 10 illustrates permeate flux of UF membrane with pure water (■), 1% (●), 5% (♦), 10% (▲), and 20% (*) whey solids in the feed solution at 55° C.

The flux measurements for pure water and clean membranes have experimental error bars of approximately 8-9%. For clean membranes the permeate flux was very sensitive to feed pressure as illustrated in FIG. 10 above. The accuracy of the pressure gage in the current test equipment was approximately 5 psi, which represents a flux variability of approximately 3 mL/min depending on the particular membrane. The flow readings from the rotometer flow gages was also a major source of error with an accuracy of about 2.5% for the lower range (#12) flow meter and 5% for the higher range (#13) flow meter. Temperature also affected the flux values, but the error bars associated with temperature were much smaller. The overall error in flux values for clean membranes with a pure water feed at 100 psi was estimated to be 6 mL/min. This error accounted for the normalized "% initial flux" values being within 8-9% of the initial flux. Beyond this error range (as observed for membranes #7 and #8 in FIG. 14) there was some other effect that lead to greatly increased flux values that was not identified at the time.

Table 2 details different cleanser solution compositions. The experiments on membranes #2 and #7 in FIG. 14 were made with the commercial (Alconox) cleansers prepared according to the manufacturer's specifications (described above). The commercial cleansers were effective in cleaning the fouled membranes.

The experiment on membrane #6 was made with the product solutions of the 2x electrolytic cell described above (Trials 2x-6 through 2x-8, Table 1). The pH of the acid solution was higher than desired for the first cleaning cycle (pH 2.9) and may have caused the initial 15% decrease in flux after the first fouling/cleaning cycle. The flux gradually increased over the next two fouling/cleaning cycles. During the first system flush with caustic/$H_2O_2$ solution, about 335-390 ppm of peroxide was consumed. This indicated that hydrogen peroxide was playing a role in the filter cleansing process. The peroxide consumption was due to it reacting with the organic foulant. Control experiments with caustic 500 ppm $H_2O_2$ solutions showed that there was no measurable consumption of H2O2 in the clean filter system during the 30 min circulation time. As $H_2O_2$ reacted with (oxidizes) organic materials it released $O_2$ as a byproduct. The released $O_2$ produced effervescing bubbles that were thought to increase turbulence at the membrane surface and increase the "scrubbing" power to remove foulants. This experiment directly demonstrated that the chemistry produced by the electrolytic cell was effective in maintaining membrane performance.

The experiment on membrane #4 was made with simulated cleanser solutions. The caustic cleanser solution did not contain $H_2O_2$ so that the effect of $H_2O_2$ on membrane cleaning could be determined. The flux values clearly decreased with each fouling/cleaning cycle. This cleanser system was ineffective.

The experiment on membrane #3 was made with the same simulated cleanser solutions as for membrane #4, but 500 ppm of $H_2O_2$ was added to the caustic solution. The presence of $H_2O_2$ greatly improved membrane cleaning performance. During the first system flush with caustic/$H_2O_2$ solution about 60 ppm of peroxide was consumed.

The experiment on membrane #5 was made with slightly different simulated cleanser solutions. The caustic solution pH was increased to 11.5 from 11.1 ($H_2O_2$ kept at 500 ppm) to increase caustic strength and the activity of the peroxide (at pH 11.6 half the peroxide is in the anionic form, HOO—, and this has much greater reactivity). The acid concentration was decreased to 0.05 M (pH ~2.2) from 0.1 M to reduce the amount of material used. During the first system flushes with caustic/$H_2O_2$ solution 100-120 ppm of peroxide was consumed. The increased pH of the caustic/$H_2O_2$ solution appears to have increased the reactivity of the peroxide. The performance of these cleanser solutions appears to have slightly improved over the experiment with membrane #3.

The experiment on membrane #8 was made with simulated cleanser solutions that were the same as for the experiment on membrane #5 except the caustic cleanser pH was increased to 11.7 from 11.5. This slight change in pH to above the buffering pH of $H_2O_2$ (ionization to $HOO^-$) resulted in a significant increase in performance. This cleanser formulation performed equally well for this application as the commercial cleansers.

The most effective simulated cleanser solutions were well within the production capability of the electrolytic cell technology. The electrolytic cell was optimized to produce lower hydrogen peroxide concentration (500 ppm) and higher catholyte pH (11.7) that were observed to be more effective in cleaning than >1000 ppm $H_2O_2$ and pH 11.6. This change in production optimization was used to accelerate the pH shifts, especially of the central chamber (sodium citrate electrolyte), and reduced the cleanser production time.

EXAMPLE 4

Effectiveness of Hydrogen Peroxide Treatment on Ballast Water

The target hydrogen peroxide chemistry was found to be effective against a variety of marine organisms. A treatment time-peroxide concentration (time*dosage) dependence was determined and clearly showed the required ballast water treatment conditions for the marine organisms evaluated. Results of the peroxide treatment studies conducted are summarized below.

This study largely entailed $LD_{50}$ and $LD_{100}$ lethality screening of the target chemistry produced by the electrolytic system under development to natural marine organisms. Specifically, the work focused on organisms with sizes of less than 100 μm as larger organisms can be readily eliminated by other technologies (screening or hydrocyclones). Within this size regime normal crustaceans, planktons, and etc. obtained by trawling were targeted. Additionally specific trials examining the effectiveness on selected plants, bacteria, zebra mussels, and a protozoan were performed. For the trawled organisms and the protozoan, destruction was noted by lack of motility. For the selected plants, bleaching of the chloroplasts was noted as this irrevocably leads to cell and organism death. Finally, the bacteria was evaluated with simple standard plating techniques.

Experimental trials were performed in four topic areas. In the first, the effectiveness of the peroxide against mixed plankton captured via plankton trawls was explored as functions of both temperature and $H_2O_2$ concentration. Here both $LD_{50}$ and $LD_{100}$ were determined. A second study explored the effectiveness of the treatment against the bacterium *Vibrio hollisae* which can cause disease in humans and tends to spread via infestations of shellfish and various marine organisms consumed by humans. Here the trials explored the combined effects of $H_2O_2$ concentration and treatment/expose time. The third study examined the treatment effectiveness on the pathogenic protista slime mold QPX which has exhibited widespread destruction of quahog populations and thus is economically significant to the shellfish industry. The effect of $H_2O_2$ concentration was explored for a fixed treatment time and temperature. A fourth series of experiments explored the treatment effectiveness against the protozoan *Perkinsus marinus* which causes the disease Dermo in shellfish and is also economically significant. The effectiveness of treatment with different $H_2O_2$ concentrations at fixed treatment times and temperatures was explored. It should be noted that the *Vibrio*, QPX, and *Perkinsus* organisms typically react similarly so that the trends seen for the QPX and *Perkinsus* trials can be expected to result in comparable combined time*dosage behavior as seen for the *Vibrio* under the more extensive testing. Thus similar concentration results can be validly extrapolated to more practical time*dosage factors for treatment viability assessment.

Figure 15:
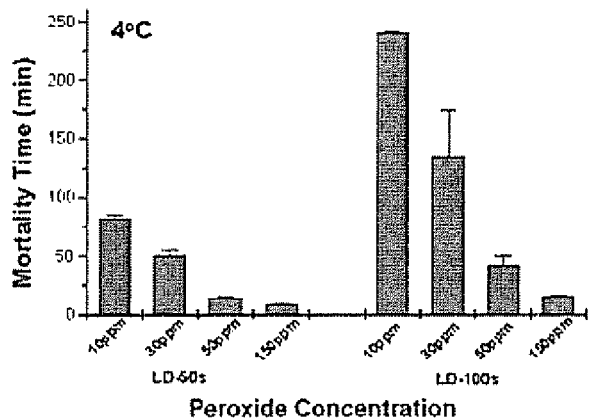
FIG. 15 is a plot of mixed plankton mortality at 4° C.
Figure 16:
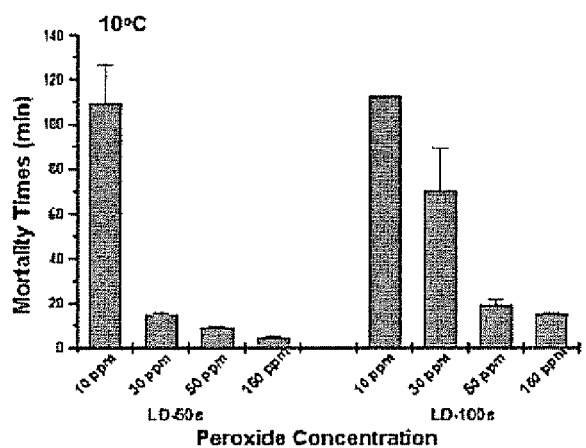
FIG. 16 is a plot of mixed plankton mortality at 10° C.
Figure 17:
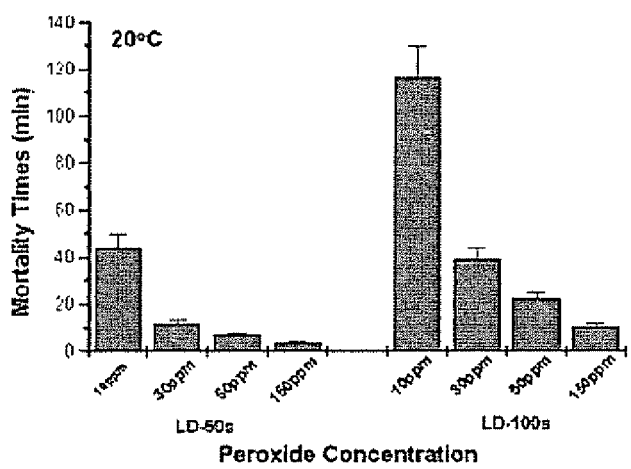
FIG. 17 is a plot of mixed plankton mortality at 20° C.
Figure 18:
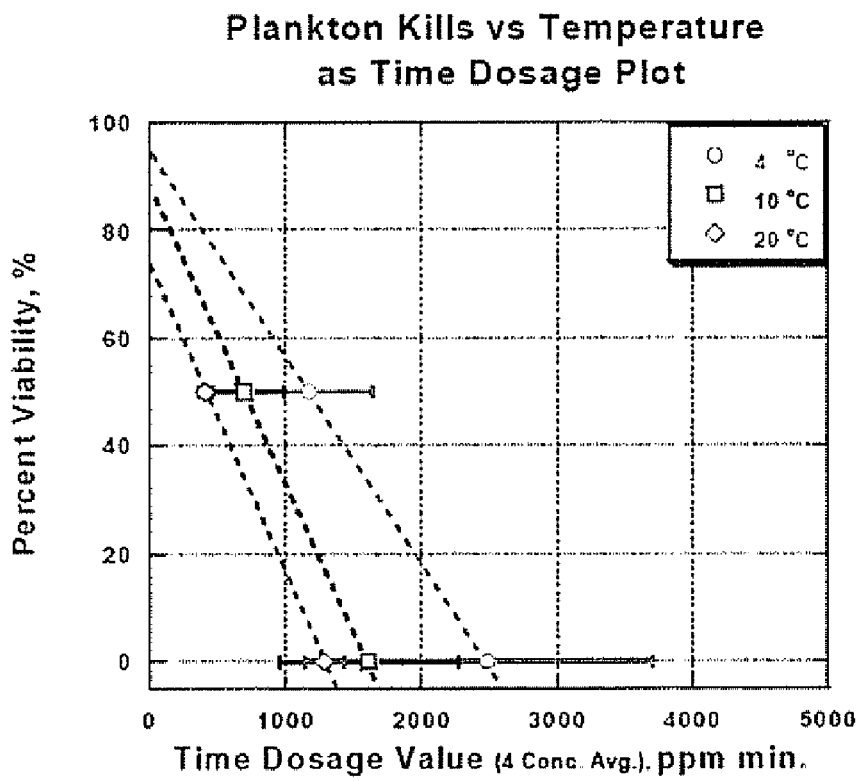
FIG. 18 is a plot of peroxide time*dosage effectiveness on plankton at different temperatures.
Figure 19:
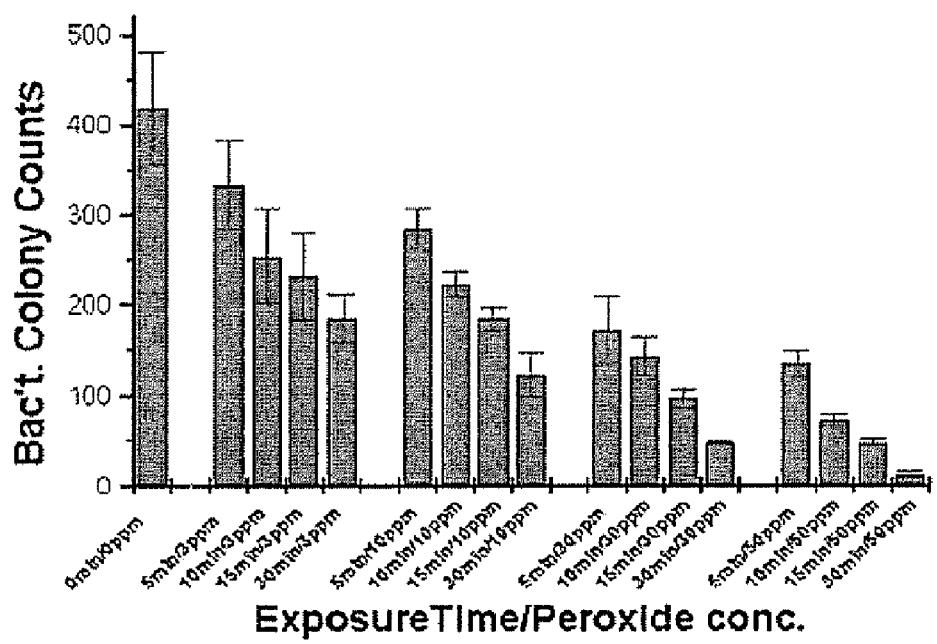
FIG. 19 is a plot of effectiveness of $H_2O_2$ vs *Vibrio hollisae* at 20° C.
Figure 20:
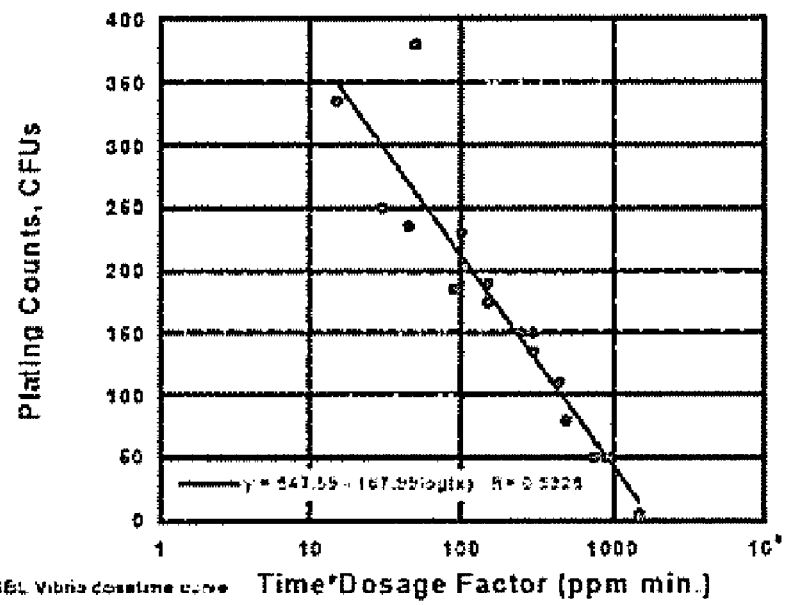
FIG. 20 is a time/dosage curve for *Vibrio hollisae* against $H_2O_2$ at 20° C.
Figure 21:
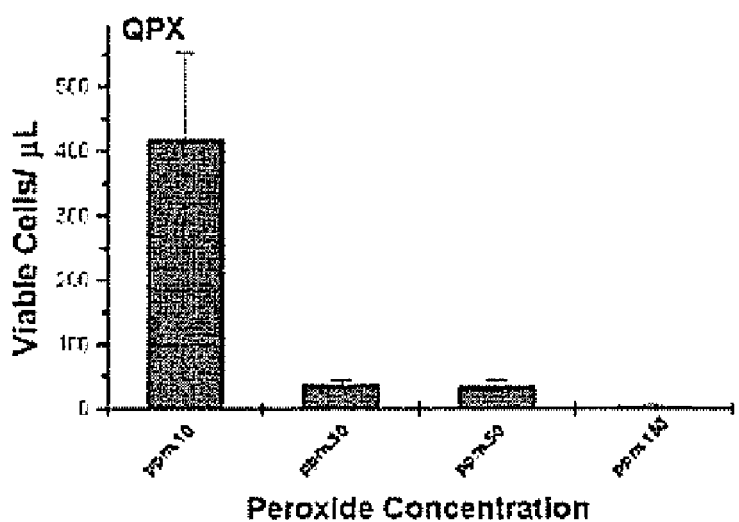
FIG. 21 shows the results of hydrogen peroxide treatment of QPX—Average result for two trials (20° C., 30 min.)

FIGS. 15-17 summarize the results obtained for a study involving mixed plankton. Mixed indigenous zooplankton (these provided random samples of a variety of organisms as might be encountered in ballast water) were obtained by plankton trawls from the waters off Woods Hole, Mass. and the toxicity assays focused on zooplankton (such as dinoflagellates which are less prone to sedimentation than say diatoms) where viability could be readily assessed through motility monitoring. After the samples were collected they were counted and separated into sample populations under a dissecting scope with a low heat lamp using standard techniques. The faunal composition of the indigenous zooplankton samples were dominated by crustaceans consisted largely of the late larval stages (megalops) of brachiuran crabs (95%). A total of 8 tows for collecting samples were performed and multiple replications of the treatments trials were performed and averaged. Sixteen replicates were performed for 20° C. while six replicates each were used for the 4° and 10° C. experiments. Generally these dominant crustaceans are more resistant and harder to eliminate and thus require higher peroxide concentrations and longer treatment times. Not surprisingly, the treatment tended to be more effective and faster acting at higher temperatures than colder temperatures but overall remained adequately effective (only about a factor of 2 to 3 times change in dosage needed for effectiveness) over the typical temperature ranges typically encountered for ballast water. FIG. 18 compiles these trials together in terms of the time*dosage concept and averages the results for the four concentrations examined. Although liberties were taken with using the two resultant points (50 percent kill/50 percent viability—LD-50, and 100 percent kill/0 percent viability—LD-100) the data appeared very reasonable and appeared to approach the control data point of NO treatment which will be near 100 percent viability. Two things were noted. First there was a large degree of scatter in the data. This was largely a result of the low number statistics of the samples (typically around 25 organisms). However, it was seen that the scatter was reduced at higher temperatures where individual organism metabolism differences would be expected to be less. Second, the treatment effectiveness was clearly enhanced with temperature however the time*dosage factor appears to fall in the range of 1000 to 3000 ppm min. and was thus quite feasible for practical application in the 1-10 ppm regime for ballast water treatment.

Toxicity studies were performed on the targeted plankton samples by exposing them to synthetic cell product and monitored until mortality occurred. Plankton left in natural seawater (pH 8.2) served as controls. The synthetic product samples were prepared by adding the appropriate amount of 3% USP grade hydrogen peroxide to filtered natural seawater (NSW) after which the pH was adjusted to the desired range with 0.1 N NaOH and the solutions allowed to equilibrate for 30 min. The pH was then re-adjusted to account for slow buffering and then the target zooplankton (minimum of 25 animals/condition) were added. By separating the zooplankton and adding it to NSW adjusted to the treatment conditions, the "shock" effect which could result from the technology's application was simulated. Times for 50% ($LD_{50}$) and 100% mortality (mortality time) were recorded. When the $LD_{50}$'s were compared to mortality times and they were found to be 40-50% of 100% mortality times; that is they were in the expected, well behaved, range. Mortality time was defined as the point when all of the plankton species ceased movement and became unresponsive to tactile stimuli.

To ensure the accuracy of mortality time determinations (i.e. the organisms were dead and not just stunned), the samples were then replaced into normal seawater (via serial dilution) after each treatment and monitored for signs of recovery. Multiple samples were run and analyzed statistically using analysis of variance (ANOVA) or Student-t, paired comparisons for statistical significance when comparing the results of different treatment conditions. Those trials not discarded by the Student-t test were averaged to yield the mean mortality times with associated error ranges.

The human pathogen bacterium *Vibrio hollisae* was put into active culture from stored, frozen stocks and were grown up to form stock solutions for treatment. A stock culture of *Vibrio hollisae* was diluted to 1×10-5 with micropore filtered seawater (FSW). The dilution was calculated to yield a sample density of roughly 350 CFUs/mL after 48 hr of grow up. The experimental matrix consisted of peroxide concentration versus exposure time. The bacteria were exposed to the peroxide in liquid cultures, and then the treated bacteria were plated onto agar plates and colony counts done at 24 and 48 hrs. Data were analyzed for LD-100 conditions for maximal effect at lowest concentration and shortest exposure time. Six tubes of 5 mL bacterial culture were prepared. Appropriate volumes of USP grade 3% hydrogen peroxide were added to yield treatment concentrations of 3, 10, 30, and 50 ppm of $H_2O_2$ (0.5, 1.7, 5.0, and 8.3 L, respectively). A control sample containing NO peroxide was also prepared. At each treatment exposure time point (6, 10, 15, and 30 minutes respectively), 1 mL was removed from each tube and filtered through a mixed cellulose ester filter (0.45 micron pore size, 47 mm dia., Fisher #09-719-1A). Each filter was then placed onto a TCBS (thiosulfate, citrate, bile, and sucrose) media plate and incubated for 48 hr at room temperature (23° C.). Standard colony counts were then made for the entire filter for each treatment condition. The procedure was repeated in triplicate. For each repetition, three separate samples (batches) were prepared and two duplicate trials were run for each batch sample. The results were statistically analyzed using ANOVA and paired student t-test paired comparisons. The results were plotted as colony counts as a function of peroxide treatment concentrations for each exposure time. The FIG. 19 shows a summary of the duplicate trials averaged together for each experimental condition. Generally a smooth kill-off curve is seen with either increases in treatment time or peroxide leading to greater kills. This is typical for bacterial and in fact, often a time/dosage factor (time×dosage) is used to compare different conditions against each other. Such a curve was prepared (see FIG. 20) from the data in FIG. 19 and appears to show typical bacterial behavior that a constant kill-off for a given time/dosage factor regardless of how the factor is achieved (this tends to deviate at high and low concentration extremes due to cellular and enzyme activity). FIG. 20 suggests that time dosage values in the 1000 to 2000 ppm min. are sufficient to achieve 2 log kills (99%) and that by extending the treatment times to several hours, the amount of peroxide required can be reduced back below 10 ppm.

For the QPX studies, a stock QPX culture (Quahog Parasite-X, a protista slime mold causing shellfish disease) was washed three times in sterile nature seawater (NSW) to remove the nutrient media and disperse the encapsulating mucous mass. The washed sample was then re-suspended in sterile NSW (working culture). A sample aliquot was removed and diluted (1:1) in sterile NSW to determine the actual cell density. Aliquots of the working culture (100 μL) were added to microfuge tubes containing 1500 μL of NSW containing hydrogen peroxide at varying concentrations (0, 10, 30, 50, and 150 ppm) and allowed to "treat" for 30 minutes. A control sample with NO peroxide in the treatment solution was also prepared. After this treat period, the hydrogen peroxide exposed innocula was recultured by adding 500 μL of it to a 4.5 mL fresh sample of culture media and incubating the sample in the dark for 48 hrs at 23° C. After incubation (48 hrs) the remainder of the innocula were centrifiged at 10,000 G for 2 minutes. All fluid was removed from the tube to leave a final volume of 100 μL. Propidium iodide (100 μL; 20 g/mL) was added to each tube and allowed to sit for 30 minutes in the dark at room temperature. The tubes were then centrifuged (10,000 G for 2 minutes) and the resulting pellet washed three times with filtered NSW (250 μL). After the third wash, 200 μL of fluid was removed from each tube and the pellet was re-suspended in the remaining 50 μL of fluid. The fluids generated from this preparation were added to a Neubauer hemocytometer counting chamber and the cell concentrations were determined between treatments. Viable cell counts were then independently verified using epifluorescence microscopy and a rhodamine filter set (excitation, BP-546 nm; emission, LP-590 nm) to determine the number of dead cells. Cell counts were reported as total viable cells per L (i.e., total viable cells=total cells−propidium iodide cells). For these studies a single sample replicate (batch) was used with duplicate trials run for each experiment for the sample. Again the results were statistically analyzed as noted above. The treatment results for QPX elimination are summarized in FIG. 21 which shows the average viable cell count for the two trials. The control data (not shown) were very similar to the 10 ppm results (430 cells/L). The QPX appears slightly more resistant to the treatment than the general plankton (1000 to 3000 ppm min.) or the bacterium *Vibrio* ssp. (1000 to 2000 ppm min.).

Figure 22:
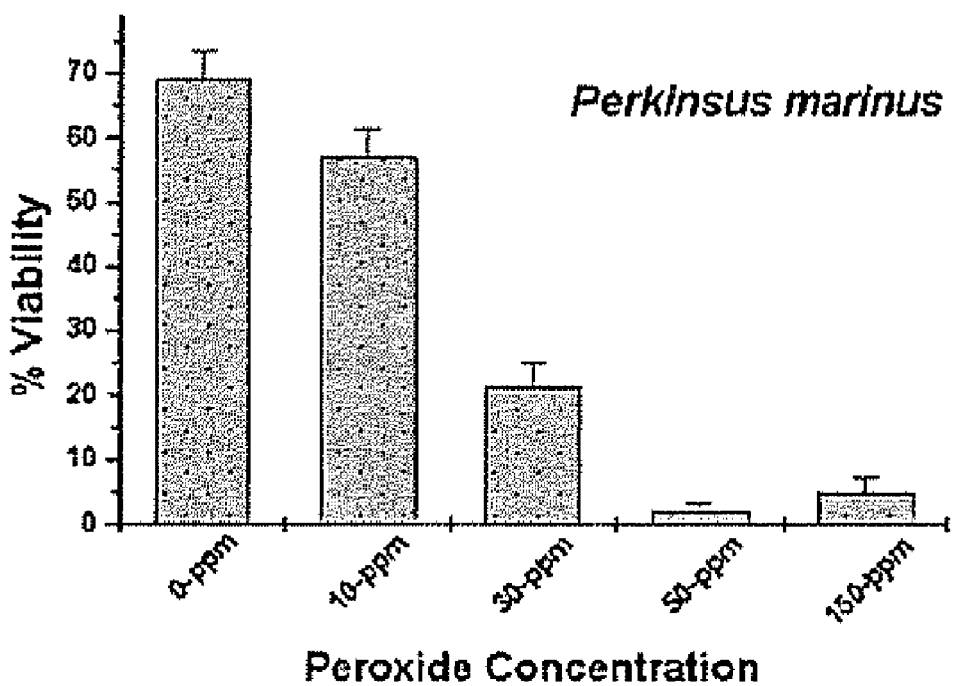
FIG. 22 is a plot of treatment effectiveness on *Perkinsus marinus* (percent viability) [average of four trials]
Figure 23:
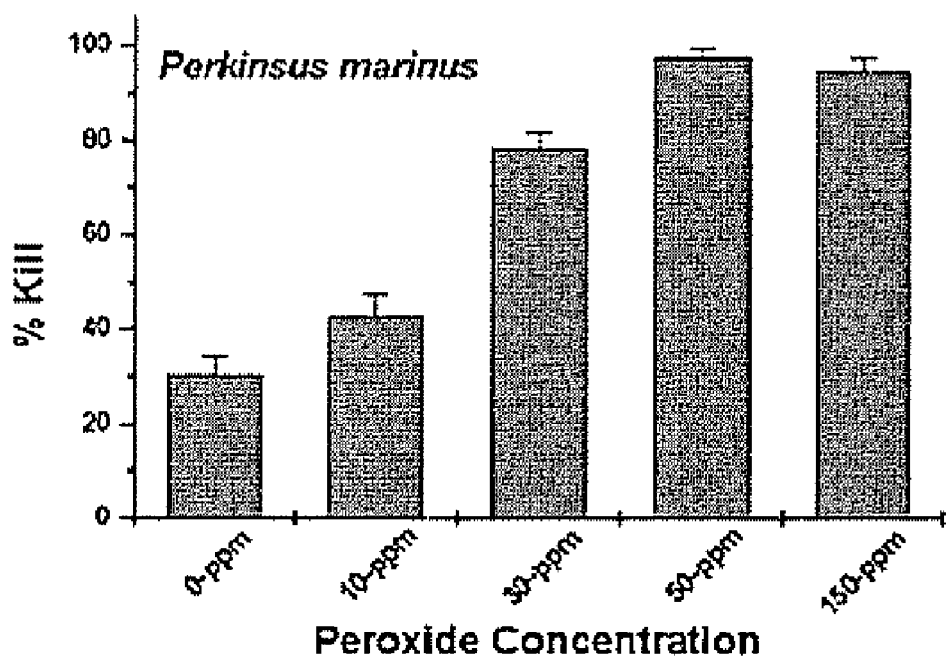
FIG. 23 is a plot of treatment effectiveness on *Perkinsus marinus* (percent kill).

The final series of trials explored the effectiveness of the treatment against the protozoan Perkinsus marinus which is pathogenic to shellfish and causes the disease Dermo. Essentially the same protocol used for QPX was adapted to Perkinsus and represented a novel method of determining Perkinsus viability after disinfection treatments. Here four duplicate trials were run, again with a treatment time of 30 minutes. FIG. 22 summarizes the averaged results of the trials in terms of the percent of viable cells observed after the treatments while FIG. 23 recasts the data in terms of a percent kill value (recall the target for success is taken as a percent kill of at least 99%). Examination of the data in terms of time*dosage values were done as the Perkinsus typically reacted to disinfection treatments in a manner similar to bacteria such as Vibrio ssp. It appeared that time*dosage values in the 1500 to 5000 ppm range were sufficient to reduce the occurrence of Perkinsus sufficiently to hinder the spread of disease.

While the preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Accordingly, the scope of protection is not limited by the description set out above, but is only limited by the claims which follow, that scope including all equivalents of the subject matter of the claims.

The disclosures of all patents, patent applications, and publications cited herein are hereby incorporated herein by reference in their entirety, to the extent that they provide exemplary, procedural, or other details supplementary to those set forth herein. In addition, the attached Appendix is hereby incorporated by reference in its entirety. The discussion of a reference in this disclosure is not an admission that it is prior art to the present invention, especially any reference that may have a publication date after the priority date of this application.

We claim:

1. An apparatus for producing hydrogen peroxide comprising:
at least one anolyte chamber, coupled to at least one anode, wherein the anolyte chamber comprises an inlet for liquid anolyte, the anolyte comprising one or more electrolytes;
at least one catholyte chamber coupled to at least one cathode, the at least one cathode comprising a carbon fiber cloth cathode anchored by one or more contacts, wherein the catholyte chamber comprises an outlet for product comprising hydrogen peroxide and an inlet for catholyte comprising oxygen-containing gas and liquid electrolyte;
at least one anode cation exchange membrane and at least one cathode cation exchange membrane, wherein the anode cation exchange membrane is adjacent to the at least one anode, wherein the cathode cation exchange membrane is in contact with the at least one cathode; and
at least one central chamber, wherein the at least one central chamber is disposed between the at least one anolyte chamber and the at least one catholyte chamber, the at least one anode is disposed between the at least one anolyte chamber and the at least one central chamber, the at least one cathode is disposed between the at least one catholyte chamber and the at least one central chamber, and wherein the central chamber comprises an inlet for a liquid electrolytic medium,
such that the apparatus is arranged in the following order: the at least one anolyte chamber, the at least one anode, the at least one anode cation exchange membrane, the at least one central chamber, the at least one cathode cation exchange membrane, the at least one cathode, and the at least one catholyte chamber.

2. The apparatus of claim 1, wherein the at least one anolyte chamber, the at least one central chamber and the at least one catholyte chamber comprises a polymeric material.

3. The apparatus of claim 2, wherein the polymeric material is selected from the group consisting of polypropylene, polyvinyl chloride, CPVC, polyacrylate, HDPE, PTFE, polycarbonate, and combinations thereof.

4. The apparatus of claim 1, wherein the anode cation exchange membrane and cathode cation exchange membrane each comprise a polymer.

5. The apparatus of claim 1, wherein the one or more contacts comprise electrodes.

6. The apparatus of claim 1, wherein the anode comprises a dimensionally stable anode.

7. The apparatus of claim 1, wherein the anode comprises a titanium mesh.

8. The apparatus of claim 1, wherein the carbon fiber cloth is configured in a zig-zag configuration, a symmetric configuration, or an asymmetric configuration.

9. An apparatus for producing hydrogen peroxide, comprising:
a first and second catholyte chamber, wherein the first catholyte chamber is coupled to a first cathode, wherein the second catholyte chamber is coupled to a second cathode;
a first cathode membrane in contact with the first cathode, wherein the first cathode is disposed between the first cathode membrane and the first catholyte chamber;
a second cathode membrane in contact with the second cathode, wherein the second cathode is disposed between the second cathode membrane and the second catholyte chamber;
a first and second central chamber, wherein the first central chamber is disposed between the first cathode membrane and a first anode membrane, wherein the second central chamber is disposed between a second anode membrane and the second cathode membrane; and
an anolyte chamber housing the at least one anode, wherein the anolyte chamber is disposed between the first and second anode membranes;
such that the apparatus is arranged in the following order: the first catholyte chamber, the first cathode, the first cathode membrane, the first central chamber, the first anode membrane, the anolyte chamber housing the anode, the second anode membrane, the second central chamber, the second cathode membrane, the second cathode, and the second catholyte chamber.

10. A method for producing hydrogen peroxide comprising:
a) supplying at least one liquid anolyte feed stream comprising one or more electrolytes, at least one liquid central chamber feed stream comprising an electrolytic medium, and at least one catholyte feed stream comprising an oxygen-containing gas in a liquid electrolyte solution to an electrolytic cell comprising at least one catholyte chamber, at least one anolyte chamber, and at least one central chamber, wherein at least one central chamber is disposed between at least one catholyte chamber and at least one anolyte chamber;
b) conveying the at least one catholyte feed stream into the at least one catholyte chamber, wherein each catholyte feed stream contacts at least one cathode, wherein the at least one cathode is in contact with at least one cathode cation exchange membrane, and wherein the at least one cathode comprises a carbon fiber cloth cathode anchored by one or more contacts;

c) conveying the anolyte feed stream into an anolyte chamber coupled to at least one anode, wherein the anolyte feed stream contacts the at least one anode, wherein the at least one anode is adjacent to at least one anode cation exchange membrane;

d) conveying the central chamber feed stream to the central chamber;

e) applying an electrical current to the at least one anode and the at least one cathode, wherein the anolyte feed stream is oxidized to produce $H^+$ protons and oxygen, wherein the $H^+$ protons move from the anolyte chamber through the at least one central chamber to the at least one catholyte chamber, wherein the at least one catholyte feed stream is reduced to form peroxide ions which react with the $H^+$ protons to form at least one catholyte exit stream comprising hydrogen peroxide; and f) removing the at least one catholyte exit stream comprising hydrogen peroxide as product.

11. The method of claim 10 wherein pH is controlled by the use of an acid, acid buffer, and/or a sodium or potassium containing electrolyte in the anolyte and central chamber feed streams.

12. The method of claim 10 wherein the operating pH is between 1 and 14.

13. The method of claim 10, wherein the anolyte feed stream comprises an electrolyte selected from the group consisting of sulfates, phosphates, and combinations thereof.

14. The method of claim 10, wherein the catholyte feed stream comprises a liquid solution, said liquid solution comprising a compound selected from the group consisting of sodium chloride, potassium chloride, hydrochloric acid, sodium bromide, potassium bromide, hydrobromic acid, sodium iodide, potassium iodide, sodium sulfate, potassium sulfate, hydrogen potassium sulfate, sulfuric acid, sodium nitrate, potassium nitrate, nitric acid, sodium phosphate, potassium phosphate, phosphoric acid, sodium citrate, potassium citrate, citric acid, sodium acetate, potassium acetate, acetic acid, sodium hydroxide, potassium hydroxide, and combinations thereof.

15. The method of claim 10, wherein the catholyte feed stream further comprises sodium chloride.

16. The method of claim 10, wherein the catholyte feed stream further comprises seawater.

17. The method of claim 10, wherein the oxygen-containing gas comprises compressed air.

18. The method of claim 10, wherein the at least one central chamber feed stream a compound selected from the group consisting of sodium sulfate, potassium sulfate, hydrogen potassium sulfate, sulfuric acid, sodium nitrate, potassium nitrate, nitric acid, sodium phosphate, potassium phosphate, phosphoric acid, sodium citrate, potassium citrate, citric acid, sodium acetate, potassium acetate, acetic acid, and combinations thereof.

19. The method of claim 10, wherein the at least one central chamber feed stream is the same composition as the at least one anolyte feed stream.

20. The method of claim 10, wherein (a) comprises supplying a first and second catholyte feed stream to an electrolytic cell comprising: a first and second catholyte chamber, a first and second central chamber, and an anolyte chamber, wherein the first central chamber is disposed between the first catholyte chamber and the anode chamber, and wherein the second central chamber is disposed between the second catholyte chamber and the anolyte chamber.

21. The method of claim 20, wherein (b) comprises conveying the first catholyte stream to the first catholyte chamber and conveying the second catholyte stream to the second catholyte chamber.

* * * * *